US012323291B2

(12) United States Patent
Howard

(10) Patent No.: US 12,323,291 B2
(45) Date of Patent: Jun. 3, 2025

(54) MANAGING NETWORK PORTS IN A VIRTUALIZATION ENVIRONMENT

(71) Applicant: F5 Networks, Inc., Seattle, WA (US)

(72) Inventor: Ryan Robert Howard, Bothell, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 16/990,099

(22) Filed: Aug. 11, 2020

(65) Prior Publication Data

US 2022/0052904 A1 Feb. 17, 2022

(51) Int. Cl.
  *H04L 41/0654* (2022.01)
  *G06F 9/455* (2018.01)
  *H04L 12/46* (2006.01)
  *H04L 47/41* (2022.01)

(52) U.S. Cl.
  CPC ...... *H04L 41/0654* (2013.01); *G06F 9/45558* (2013.01); *H04L 12/4641* (2013.01); *H04L 47/41* (2013.01); *G06F 2009/45595* (2013.01)

(58) Field of Classification Search
  CPC ....... G06F 9/45558; G06F 2009/45595; H04L 12/4641; H04L 41/0654; H04L 45/245
  See application file for complete search history.

(56) References Cited

U.S. PATENT DOCUMENTS

| | | | |
|---|---|---|---|
| 8,503,468 B2 | 8/2013 | Akyol et al. | |
| 8,645,605 B2 | 2/2014 | Subramaniyan et al. | |
| 9,727,386 B2 | 8/2017 | Lu | |
| 10,530,636 B2 | 1/2020 | Ma | |
| 11,061,712 B2* | 7/2021 | Kaplan | G06F 9/45558 |
| 11,265,251 B2* | 3/2022 | Kommula | G06F 9/45558 |
| 2010/0115174 A1* | 5/2010 | Akyol | G06F 13/385 |
| | | | 710/316 |
| 2012/0287939 A1 | 11/2012 | Leu et al. | |
| 2013/0148546 A1* | 6/2013 | Eisenhauer | H04L 49/354 |
| | | | 370/255 |
| 2014/0201733 A1* | 7/2014 | Benny | G06F 9/45558 |
| | | | 718/1 |

(Continued)

FOREIGN PATENT DOCUMENTS

WO    2014074542 A1    5/2014

OTHER PUBLICATIONS

Bhosale et al., IBM Power Systems SR-IOV Technical Overview and Introduction, available at: http://www.redbooks.ibm.com/redpapers/pdfs/redp5065.pdf; Jul. 2014.

(Continued)

*Primary Examiner* — Basil Ma
(74) *Attorney, Agent, or Firm* — Troutman Pepper Locke LLP

(57) ABSTRACT

Technology related managing network ports in a virtualization environment is disclosed. In one example, a method includes, without using operating system control, bonding a plurality of physical ports into a link aggregation group accessible from a network interface. A device function can be assigned to a virtual machine. The device function can be used for communicating between the network interface and the virtual machine via an interconnect. The device function can be used to forward network traffic between the virtual machine and the network interface, and across the link aggregation group.

16 Claims, 8 Drawing Sheets

(56) References Cited

U.S. PATENT DOCUMENTS

| | | | |
|---|---|---|---|
| 2016/0065680 A1* | 3/2016 | Harper | G06F 9/45558 |
| | | | 709/225 |
| 2017/0257309 A1* | 9/2017 | Appanna | H04L 12/4641 |
| 2017/0289040 A1* | 10/2017 | Sreeramoju | H04L 45/245 |
| 2019/0020501 A1 | 1/2019 | Yu et al. | |
| 2019/0132241 A1* | 5/2019 | Vattem | H04L 12/4633 |
| 2021/0243639 A1* | 8/2021 | Sanaullah | H04W 28/0257 |
| 2021/0273891 A1* | 9/2021 | Labonte | H04L 49/252 |
| 2021/0377117 A1* | 12/2021 | Kanevsky | H04L 41/0843 |

OTHER PUBLICATIONS

Ron Emerick, Emerick—PCI-Express IO Virtualization Overview, available at: https://www.snia.org/sites/default/files/RonEmerick_PCI_Express_IO_Virtualization.pdf; 2012.
Microsoft, Network Driver Design Guide, Available at: htttps://docs.microsoft.com/en-us/windows-hardware/drivers/opbuildpdf/network/toc.pdf?branch=live, retrieved Jun. 22, 2020, pp. 1235-1607.
European Search Report for corresponding EP Application No. 21188655.1, Dec. 22, 2021, pp. 1-7.
EP Patent Application No. 21188655.1, Office Action, dated Sep. 15, 2023.

* cited by examiner

MANAGING NETWORK PORTS IN A VIRTUALIZATION ENVIRONMENT

FIELD

This technology generally relates to network traffic management, and more specifically to managing network ports that carry network traffic in a virtualization environment.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. Additionally or alternatively, the application server computers can push information (without an initiating request) to the client devices over the interconnection network. As the number of client devices seeking access to the application server computers increases, intermediary computing devices, such as network traffic management computing device(s), can be added between the client devices and the application server computers. Network traffic management computing device(s) can perform security, processing, and/or routing functions of the client-server architecture, such as encrypting and/or decrypting traffic between the client and the application server. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network traffic management system including one or more network traffic management modules, networking modules, or server modules, the method including: without using operating system control, bonding a plurality of physical network ports into a link aggregation group accessible from a network interface. The method also includes assigning a device function to a virtual machine, the device function used for communicating between the network interface and the virtual machine via an interconnect. The virtual machine executes on the one or more network traffic management apparatuses. The method also includes using the device function to forward network traffic between the virtual machine and the network interface, and across the link aggregation group.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for managing network ports in a virtualization environment, the instructions comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

DETAILED DESCRIPTION

Introduction

Figure 1:
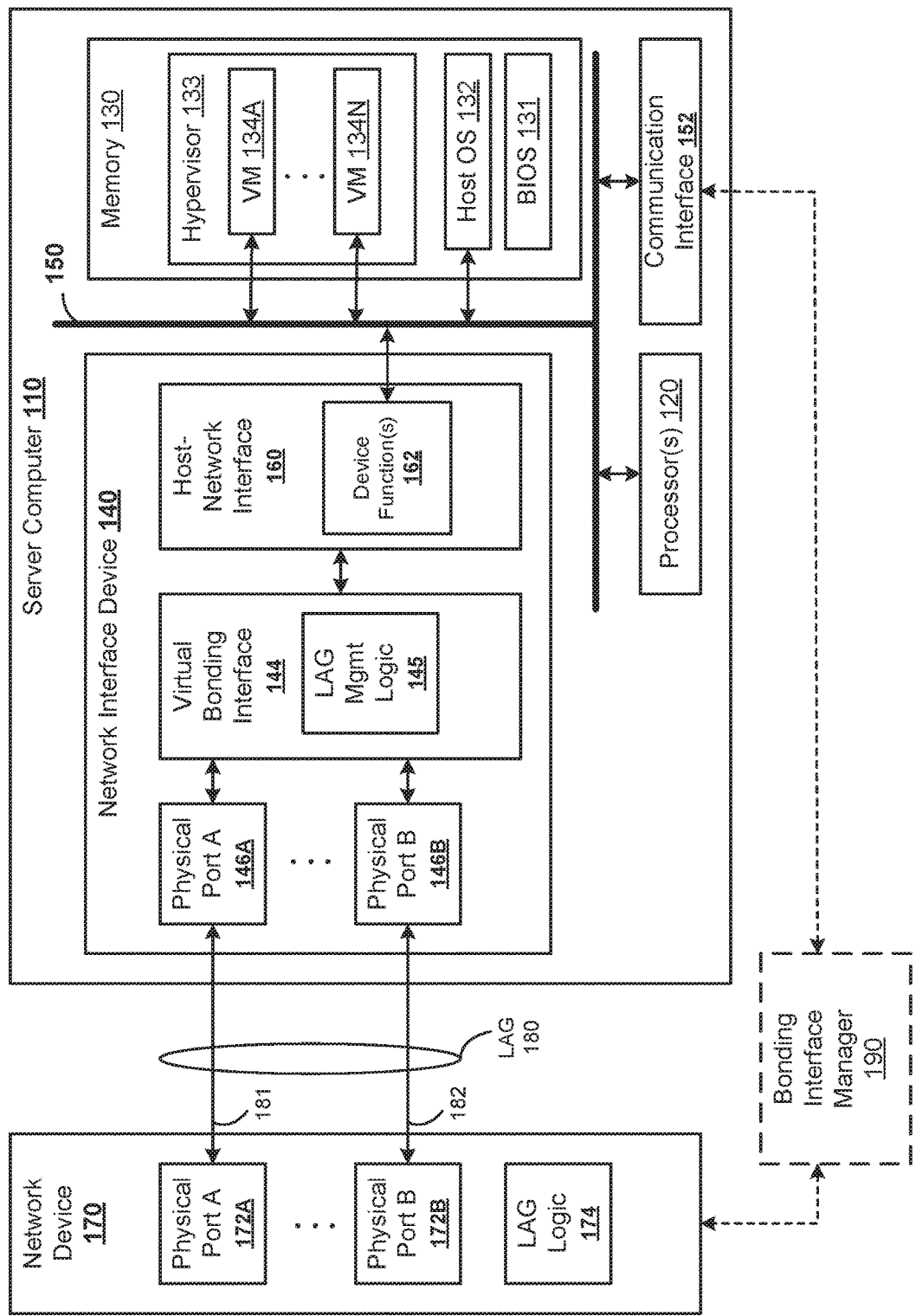
FIG. 1 is a block diagram of an example architecture including a server computer capable of executing a virtualization environment, where the server computer includes a network interface device capable of connecting to a network device using a bonded network port.

A computing infrastructure to support a network-accessible client-server software application can include various interconnected computing devices to potentially increase scalability, availability, security, and/or performance of the client-server architecture. As one example, an intermediary server computer can be positioned logically between client devices seeking access to a client-server software application and the server computers that execute the server-side of the client-server software application. An intermediary server computer can perform various proxy and other services, such as load balancing, rate monitoring, caching, encryption/decryption, session management (including key generation), address translation, and/or access control, for example. An intermediary server computer can act as a proxy for an application server. A proxy is an agent that is situated in a path of communication between a client and a server (e.g., an application server) that can intercept communications (e.g., network packets, frames, datagrams, and messages) between the client and the server. Load balancing can include distributing or disaggregating workloads from many clients across different server computers. Additionally, functions performed by the application server computer can be offloaded from the application server computer to the intermediary server computer.

The computing devices of the computing infrastructure can be interconnected via a communications network. A computing device that is capable of being connected to a network can also be referred to as a network device. Data can be sent between the computing devices by encapsulating the data in network packets and forwarding the network packets from one device, through the network, and to another device. Generally, network traffic is one or more network packets flowing through a network. The network packets can be formatted according to one or more communications protocols that are partitioned into different layers. For example, the layers within a network packet can be described using the Open Systems Interconnection (OSI) model which partitions the different functions of a communication system into respective abstraction layers. In particular, the OSI model partitions a communication system into seven layers. A particular layer provides a communication path with the layers adjacent (e.g., a layer above and a layer below) to the particular layer. The lowest layer is the physical layer (also referred to as layer 1 or L1) which defines the electrical and physical specifications for communication over a physical transmission medium. Specifically, the physical layer can define voltage levels, signal timing, transmission media (e.g., electrical cables, fiber-optic cables, radio frequencies), and so forth. The physical layer can provide a communication path with the data link layer or link layer (also referred to as layer 2 or L2). The link layer defines the protocols for transferring data between two nodes. Additionally, the link layer can define protocols for establishing and terminating connections between nodes, managing flow control, and detecting and/or correcting errors occurring on the physical layer. Ethernet is an example of a link layer protocol. The link layer can provide a communication path with the network layer (also referred to as layer 3 or L3). An example network layer protocol is Internet Protocol (IP) (including IPv4 and IPv6). Other layers of the OSI model include the transport layer (also referred to as layer 4 or L4), the session layer (also referred to as layer 5 or L5), the presentation layer (also referred to as layer 6 or L6), and the application layer (also referred to as layer 7 or L7). It should be noted that a network packet (or simply a packet) generally includes a header used to address the packet to another entity (e.g., another service, a remote node, or another agent) at the layer of the packet and a payload having a discrete quantity of information. A packet addressing an agent at one layer can be encapsulated within a payload of a packet at a lower layer as the original packet transits the communication layers. A packet of the link layer can also be referred to as a frame. A packet of the transport layer can also be referred to as a datagram. The OSI model is a reference and some networking protocols may not strictly adhere to the seven layers of the OSI model. For example, in some embodiments, the functions of the link layer and the physical layer may be blended into a single link layer. The combination of protocols used at the different layers of the OSI model can be referred to as a protocol stack. For example, one particular protocol stack may include an IP layer and an Ethernet layer.

The amount of network traffic passing through the network and processed by the interconnected computing devices (including the intermediary server computer) can be a function of an organization, a number, and a speed of network links of the network. A network link is a direct logical connection between different computing devices that are capable of being connected to a network. The network link can be implemented using a physical communication channel (e.g., a cable) connecting physical network ports of the computing devices. A physical network port (also referred to as a network port, a physical port, or simply a port) is a physical connection to a computing device, that when connected to a network, is capable of communicating network traffic to and/or from the device. The physical connection can be hardwired to a physical communication channel or it can include a connector (e.g., a female connector) for connecting to a connector (e.g., a male connector) of a network cable. For example, a network link can be formed when a network port of a first computing device is connected to a network port of a second computing device using a cable (e.g., electrical or optical). The physical communication channel can have a carrying capacity or bandwidth that is a function of the communication protocol used for the communication and the physical characteristics of the channel. For example, different types of network cables can have transmission capacities for sending Ethernet frames of 10 Megabits per second (Mbps), 100 Mbps, 1 Gigabits per second (Gbps), 10 Gbps, 100 Gbps, and so forth. In some examples, a physical network port can be divided into multiple logical sub-channels that divide the network bandwidth and traffic among the different sub-channels. For example, a 10 Gbps optical link can include four 2.5 Gbps sub-channels and each sub-channel can be used as a separate physical network port.

A given computing device (e.g., the intermediary server computer) can include multiple network ports. The amount of network traffic passed between a pair of computing devices can potentially be increased by bundling different network links of the computing devices together into a link aggregation group (LAG). When a network link uses multiple sub-channels, some or all of the different sub-channels can be bundled together into a LAG. Bundling can also be referred to as link aggregation, trunking, or bonding; a LAG can also be referred to as a trunk, a bonded link, or a bundled link. Additionally or alternatively, a LAG can potentially increase reliability by providing redundant paths through the network and between devices. As one example, a host computer can have two physical network ports and a network switch can have sixteen physical network ports. The connections for a LAG can be created between the host computer and the switch by connecting one end of a first cable to a first physical port of the host computer and the other end of the first cable to a first physical port of the switch, and connecting one end of a second cable to the second physical port of the host computer and the other end of the second cable to a different physical port of the switch. The LAG can be completed by configuring the host computer and the switch to use the different network links together as a group. As one example, the host computer and the switch can be configured by an administrator of the computing infrastructure. Configuring the network devices can include programming a routing table and programming control bits or other state of the network devices. As another example, a control protocol can be used to automatically configure the host computer and the switch to use the different network links as a LAG. As a specific example, the control protocol can be the Link Aggregation Control Protocol (LACP). LACP can be launched and executed using a kernel module of an operating system of the host computer, for example. LACP can detect that different network links are connected to the same pair of devices, negotiate a speed and mode of the LAG, and monitor a status (e.g., up or down) of the links of the LAG.

The intermediary server computer can execute a variety of different functions which can be isolated and/or partitioned from one another to increase security, performance, and/or availability of the computer. As one example, the intermediary server computer can be partitioned based on underlying hardware of the computer. Specifically, lower-level networking functions (e.g., layer 2 and below) performed by network interface hardware (e.g., a network interface card (NIC)) can be partitioned from general-purpose computing functions (e.g., application software executing on a central processing unit (CPU)). The different partitions can communicate over an interconnect of the computer using a communications protocol (such as Peripheral Component Interconnect Express (PCIe or PCI-Express)). As another example, the software executing on the CPU of the intermediary server computer can be partitioned and isolated. Specifically, a host operating system (OS, such as WINDOWS or LINUX) can include kernel routines and device drivers for managing different aspects of the execution of programs and for interfacing with the hardware of the computer. For example, a program can be launched from and be executed using the host OS. When the program is launched from the host OS, the services of the host OS can be directly accessed by the program. Additionally, programs can be executed within a virtualization environment that runs on the host OS.

The virtualization environment (also referred to as a containerized environment) can be used to provide a platform for executing software applications on an emulated computer system (e.g., a virtual machine executing a guest OS) that is consistent from one physical machine to another. A virtual machine includes emulated computer hardware and can provide virtual storage, computation, networking, and memory resources. The virtualization environment can be ported to execute on different physical hardware configurations and/or different host OSs while the emulated computer system provides the same interface to software applications executing on the emulated computer system. Virtualization environments can potentially be helpful to a software developer because the developer can potentially write one software application which can be executed within the emulated computer system, which can be executed on multiple physical computer hardware configurations. Without the virtualization environment, the developer may spend resources porting (e.g., rewriting) the software application to execute on the different physical computer hardware configurations.

The virtualization environment includes a hypervisor that manages and executes virtual machines and guest OSs within the emulated computer system. A hypervisor is software that performs the emulation of one or more virtual machines and provides a guest OS for a program to execute on one of the virtual machines. A host OS differs from a guest OS based on where the OS is executed: a guest OS executes within a hypervisor environment and a host OS executes outside of a hypervisor environment. A type 1 hypervisor (also referred to as a bare metal hypervisor) executes directly on the computer hardware (e.g., without using the host OS) and a type 2 hypervisor executes on the host OS which provides virtualization services. The hypervisor provides a layer of abstraction between the program and the host OS and/or the physical hardware. In other words, the program executes on the guest OS of the virtual machine which is emulated by the hypervisor, and the hypervisor can communicate with the host OS which communicates with the hardware of the computer. Using virtual machines can make a program more portable (e.g., because a virtual machine can have the same architecture even when executing on different physical hardware) and can potentially result in a fairer allocation of the computer resources when multiple programs are running concurrently on the computer. The hypervisor can provide isolation between the different virtual machines executing on the hypervisor by allocating private resources for the individual virtual machines. On the other hand, virtual machines can add abstraction layers (compared to executing directly on the host OS) that can potentially make a program less efficient to execute. An example type 2 hypervisor is the kernel-based virtual machine (KVM) packaged with some Linux releases; an example type 1 hypervisor is the VMWARE hypervisor.

The host OS, the hypervisor, and/or the virtual machines can communicate with input/output (IO) devices using an interconnect such as PCIe. PCIe includes virtualization extensions, such as the single root input/output virtualization (SR-IOV) and multi-root input/output virtualization (MR-IOV) extensions for use with a virtualization environment. MR-IOV adds protocols and data structures that enable multiple hardware domains to share an input/output (IO) device among multiple virtual machines executing on the different hardware domains. SR-IOV adds protocols and data structures that enable a single hardware domain to share an IO device among multiple virtual machines executing on the single hardware domain. For example, the virtual machines can communicate with the IO device using one or more device functions of the IO device. Each device function can be assigned respective addresses on the interconnect in a configuration space and/or an IO space. Each device function has a corresponding set of configuration registers in configuration space. The configuration registers are organized as a data structure that describes capabilities of and other information about the device function. A host or guest OS can read the configuration registers associated with the device function to determine the capabilities and other information of the device function. Each device function can also be used for transferring data between the IO device and a respective virtual machine, such as by writing and/or reading data from IO addresses assigned to the device function. As one example, an SR-IOV capable network interface device can provide device functions, such as a physical function (PF) and one or more virtual functions (VFs), for accessing the network interface device over the PCIe interconnect. A PF can be assigned to each physical network port of the network interface device. A hypervisor or host OS can read the configuration registers of a PF to determine whether the network interface device has SR-IOV capabilities. The hypervisor can assign a different VF to each virtual machine so that each virtual machine has a unique access path to and from the network interface device. For example, a virtual machine can send a network packet to the network interface device by writing the data corresponding to the network packet to the IO addresses assigned to the VF assigned to the virtual machine.

As described above, bundling network ports and executing in virtualization environments can be used to potentially increase scalability, availability, security, and/or performance of a client-server architecture. However, port bundling can be incompatible with some computer hardware, operating system, and/or virtualization environment configurations. As a specific example, LACP is not supported in environments where VFs and SR-IOV are used on a network interface device. For example, one potential issue is that a network switch can only bring up a single set of bonded ports, such as by using the PFs on the network interface device side. For example, using SR-IOV, a PF can be shared out as multiple VFs so multiple VM guests appear to have a dedicated network interface device. Once a single bond is brought up by either a PF or VF set, the network switch ignores further signaling and the VFs may cease to work. Even if port bundling was supported in environments where VFs and SR-IOV are implemented, security risks can be introduced. For example, the architecture and rights restrictions used to configure and execute a containerized environment may be incompatible with best practices for executing a multi-tenant environment, where each tenant can be assigned a different virtual machine so that each tenant is to be isolated from the other tenants. For example, a tenant may need root privileges to configure a network interface device, such as when media access control (MAC) addresses and virtual local area network (VLAN) filters are programmed on the network interface device. However, providing a tenant with root privileges can enable the tenant to observe and/or modify operations and data of another tenant, which violates isolation of the tenants. Additionally, any VLANs associated with a bundled port may be inherently shared among all the VFs of the network interface device which may cause resource contention and security issues. For example, without additional preventative measures, one VM guest can claim access to any VLAN and intercept or disrupt traffic of another VM guest.

As described herein, a computing system can implement port bundling and IO virtualization concurrently by isolating and segregating port bundling operations from device functions that are accessible by a virtualization environment. Specifically, the port bundling operations can be segregated from device functions that are accessible using an interconnect (such as PCIe with the SR-IOV extension). As one example, LAG management logic can be implemented in firmware, hardware, and/or software of a network interface device and segregated from guest or host OS control. The LAG management logic can create a LACP bond to a network switch that is connected to the physical network ports of the network interface device. Individual SR-IOV VFs can be assigned to each virtual machine and/or tenant and each VF can be assigned to carry only specific VLANs for security purposes. By separating the SR-IOV functionality from the LAG functionality, security and isolation between the different tenants can potentially be increased and the LAG functionality can be backwards compatible with existing network switches in both standalone and multi-chassis link aggregation (MLAG) configurations.

The network interface device can also include additional features to support virtualization. As one example, the network interface device can throttle an amount of bandwidth provided for a given virtual function. The amount of bandwidth can be controlled for an individual virtual function or a group of virtual functions. As another example, the network interface device can provide a bandwidth carveout to guarantee an amount of bandwidth to a given virtual function. As another example, the network interface device can enable asynchronous bandwidth to a virtual function, such that an ingress data rate is different from an egress data rate. By limiting upload bandwidth for a client device, an impact from attacks from and/or bad programming of the client device can potentially be reduced. As another example, the network interface device can prioritize traffic from one or more virtual functions over other virtual functions. Prioritizing traffic can be used to deliver a quality of service (QoS) for voice, video and other applications. As another example, the network interface device can monitor the network traffic and/or behavior of the individual virtual functions to determine a health of the virtual machine associated with the virtual function. A network switch attached to the network interface device may not have an indication that the virtual machine is unhealthy when network traffic of other virtual machines continues to flow through the LAG. If the network interface device determines that the virtual machine is unhealthy, actions can be initiated, such as failing over to a different virtual machine (on the same or a different host) and/or having the network traffic re-routed (such as be modifying a routing table of the network switch).

Example Architectures for Managing Network Ports in a Virtualization Environment FIG. 1 is a block diagram of an example architecture 100 including a server computer 110 capable of executing a virtualization environment (e.g., using a hypervisor 133). The architecture 100 can include a server computer 110, a network device 170, and an optional bonding interface manager 190. The server computer 110, the network device 170, and the bonding interface manager 190 can each be implemented using a computing environment as described in more detail with reference to FIG. 8. The server computer 110 includes a network interface device 140 capable of connecting to the network device 170 using a bonded network port (e.g., LAG 180) that is compatible with the virtualization environment. The network interface device 140 can include multiple physical network ports (e.g., physical port A 146A and physical port B 146B) and the network device 170 can include multiple physical ports (e.g., physical port A 172A and physical port B 172B). The LAG 180 can include a first network link 181 connecting the physical ports 172A and 146A, and a second network link 182 connecting the physical ports 172B and 146B. By using multiple network links to connect the server computer 110 to the network device 170, the network bandwidth between the devices can be increased and/or the network path can be made more reliable due to the redundant network links.

The network device 170 can be used to send and receive network traffic to and from the server computer 110 over the LAG 180. For example, the network device 170 can be one hop along a network path between the server computer 110 and another computing device. Network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, wireless access points, and endpoint computing devices (e.g., clients and servers), for example. The network device 170 can include the physical network ports 172A-B and LAG logic 174. The LAG logic 174 can be used to program and store configuration information for the network device 170 that enables the physical network ports 172A-B to be used together as a LAG. For example, the LAG logic 174 can be used to perform operations as part of a link control protocol, such as LACP. The LAG logic 174 can be implemented and hardware, software, or a combination thereof. Additionally or alternatively, a bonding interface manager 190 can be used to configure the network device 170. For example, the bonding interface manager 190 can program the network device 170 to use the network links attached to the physical ports 172A-B as a LAG. The bonding interface manager 190 can be external to the server computer 110 and in communication with the server computer 110 using the communication interface 152. Alternatively, the bonding interface manager 190 can be internal to the server computer 110 and can communicate with the network device 170 using the communication interface 152.

The server computer 110 can include the processor(s) 120, memory 130, the network interface device 140, storage (not shown), and the communication interface 152. The different components (120, 130, 140, and 150) of the server computer 110 can be interconnected using a local interconnect 150 of the server computer 110 so that the different components can communicate with each other. For ease of illustration, the local interconnect 150 is shown in a simplified form (e.g., a bus). However, the local interconnect 150 can include various components used for communicating data between the components 120, 130, 140, and 150. As one example, the local interconnect 150 can include an IO controller (also referred to as a Southbridge) and/or a memory controller (also referred to as a Northbridge). The local interconnect 150 can implement a communication protocol, such as the PCIe protocol. As another example, the interconnect 150 can be used for communication between different chassis within a rack or room.

The communication interface 190 and the network interface device 140 can be used to send and receive communications (e.g., network packets) with other computing devices, such as a client and a server. As one example, the communication interface 152 can include a relatively low speed network interface for use as a management or control plane and the network interface device 140 can include higher speed physical network ports 146A-B for use as a data plane. The processor 120 can be used to execute computer-executable instructions that are stored in the memory 130 and/or storage (not shown). The computer-executable instructions can be organized into software routines (also referred to as modules or components) comprising executable code to perform various computing tasks. The memory 130 can also include structured and/or unstructured data that is used by the software routines to perform the computing tasks. It should be noted that while FIG. 1 illustrates one organization of routines, other organizations are possible. For example, the illustrated routines can be sub-divided into smaller routines and/or combined into larger routines.

The host operating system (OS) 132 and basic input/output system (BIOS) 131 can include different software routines (e.g., kernel routines, BIOS settings, and device drivers) for managing different aspects of the execution of programs (e.g., the hypervisor 133 and software applications executing within the virtual machines 134A-N) and for interfacing with the hardware (e.g., the processor 120, the interconnect 150, and the network interface device 140) of the server computer 110. For example, the host OS 132 can manage the loading and removal of data, software applications, and other routines into the memory 130 of the server computer 110; the host OS 132 can manage storage resources (not shown) of the server computer 110; the host OS 132 can manage processes and/or threads executing on the processor 120; the host OS 132 can manage power states of the server computer 110; the host OS 132 can provide an interface for applications and other routines to send and receive communications (e.g., network packets) using the communications interface 152 and/or the network interface device 140; and the host OS 132 can enable inter-process communication between different routines executing on the server computer 110. The host OS 132 and BIOS 131 can enable virtualization on the server computer 110, such as by providing kernel routines that implement virtualization extensions (e.g., SR-IOV and/or MR-IOV). For example, the host OS 132 can include device drivers that are used for communicating between a program and hardware of the server computer 110. A device driver is a software that provides an interface between a program and computer hardware. Device drivers are generally specific to a particular operating system. As a specific example, a device driver can provide an interface between programs executing on the host OS 132 and the network interface device 140. Different programs may have different device drivers for accessing the network interface device 140. As another example, a device driver can provide an interface between programs executing on a guest OS (not shown) within a virtual machine (e.g., virtual machines 134-N) and the network interface device 140. The host OS 132 can include one or more routines for bonding physical network links, such as the Linux bonding driver packaged with some versions of Linux. As described herein, the Linux bonding driver is not used to bond the links 181 and 182 because the links 181 and 182 are bonded using the LAG management logic 145 which is external to and outside of the control of the host OS 132. A program can be launched from and be executed using the host OS 132. When the program is launched from the host OS 132, the services of the OS 132 can be directly accessed by the program. Additionally or alternatively, programs can be executed within a virtualization environment that runs on the host OS 132.

The virtualization environment can be implemented using the hypervisor 133. The hypervisor 133 can include management routines for managing the virtualization environment and runtime routines for executing multiple virtual environments 134A-N. For example, the hypervisor 133 can launch and control execution of virtual machines 134A-N and it can isolate the different virtual machines 134A-N from each other. Each virtual machine can execute a guest OS, and the guest OS can execute software applications. For example, the software applications can include web proxy software, firewall software, web server software, and so forth. The hypervisor 133 can allocate physical resources for use by the virtual machine, such as storage, memory, networking, and computing resources. For example, the hypervisor 133 can allocate an individual device function (from the device function(s) 162) to a virtual machine for the virtual machine's exclusive use. The device function 162 can be used for communicating network packets between the virtual machine and the network interface device 140. For example, the device function 162 can include one or more interrupt signals, control register(s), and/or address ranges for sending and receiving network data. When the hypervisor 133 is executing multiple virtual machines, each virtual machine can be assigned its own device function 162 for its exclusive use. By using different device functions for the prospective virtual machines, the network traffic of one virtual machine can be isolated from the other virtual machines to increase a confidentiality and security of the network traffic compared to using a single device function for all of the virtual machines.

The network interface device 140 can include the physical ports 146A-B, a virtual bonding interface 144, and a host-network interface 160. The network interface device 140 provides an interface between a communications network and the software applications running on the server computer 110. As one example, the network interface device 140 can be a removable or nonremovable electronic circuit card that plugs into an expansion slot of the interconnect 150. This configuration of the network interface device 140 can also be referred to as a network interface card (NIC). The network interface device 140 can include computer hardware, software, and combinations thereof. As one example, the network interface device 140 can be implemented using a programmable accelerator as described with reference to FIG. 4.

The physical ports 146A-B include electronic circuitry for sending network packets over a transmission medium. For example, the physical ports 146A-B can implement the physical layer of a network protocol stack. The virtual bonding interface 144 can be used as an interface between the physical ports 146A-B and the host-network interface 160. As one example, the virtual bonding interface 144 can implement the link layer of the network protocol stack. Specifically, network packets arriving from the host-network interface 160 can be encapsulated within a link layer frame for transmission by the physical ports 146A-B. The virtual bonding interface 144 can control which physical port 146 is used for transmitting a given frame. Network packets can be unencapsulated from frames arriving at the physical ports 146 (e.g., that were transmitted by the network device 170). The received network packets can be transferred to the host network interface 160. Additionally, the virtual bonding interface 144 can include the LAG management logic 145 for managing the LAG 180. For example, the LAG management logic 145 can communicate with the LAG logic 174 of the network device 170 to implement a link bundling protocol, such as LACP. The LAG management logic 145 can initialize and maintain the LAG 180 independent of the host OS 132. The LAG management logic 145 is further described below with reference to FIG. 2. Accordingly, the virtual bonding interface 144 can segregate the port bundling functionality from the host OS 132 such that the host OS 132 does not have visibility that the network interface device 140 is connected to a LAG.

The host-network interface 160 can provide an interface between the interconnect 150 and the virtual bonding interface 144. For example, the host-network interface 160 can implement the device function(s) 162. As one example, the interconnect 150 can be a PCIe interconnect, and the device function(s) 162 can include one or more of physical function(s), virtual function(s), or combinations thereof. A given device function 162 can include one or more interrupt signals, control register(s), and/or address ranges for sending and receiving network data. As one example, an interrupt signal associated with a given device function 162 can be asserted when a network packet associated with the device function is received. The received network packet can be read by a reading from the address range corresponding to the device function. As another example, a network packet to be sent across the LAG 180 can be written to an address range corresponding to the device function. Accordingly, network traffic can be communicated between the software applications executing on the virtual machines within the hypervisor 133 and the host network interface 160 by reading and writing data over the interconnect 150.

Figure 2:
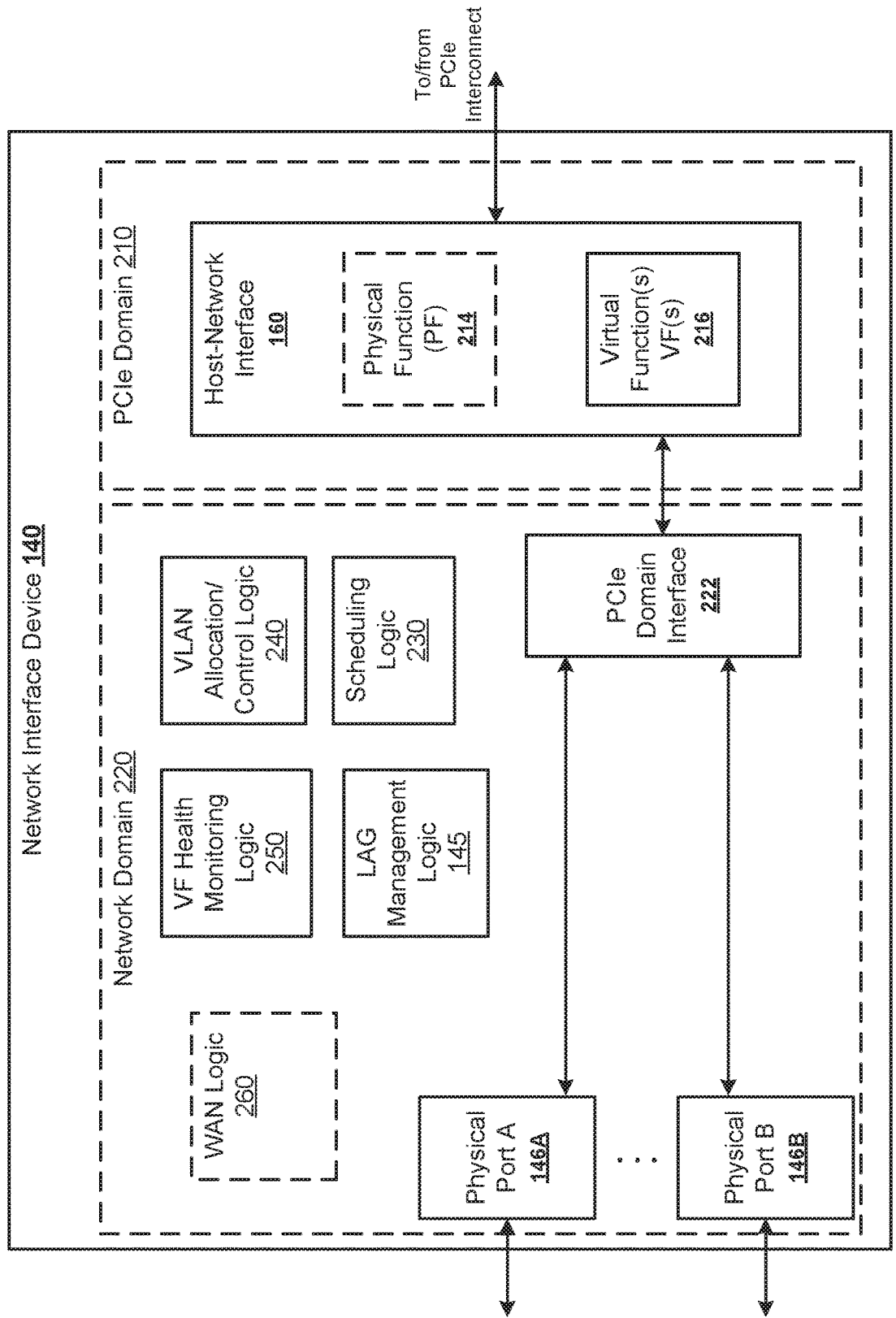
FIG. 2 is a block diagram of an example architecture of a network interface device.

FIG. 2 is a block diagram of an example architecture of a network interface device 140. The functionality of the network interface device 140 can be separated into different domains, where a domain is based on how the logic within the domain is controlled, the functionality of the logic within the domain, and the interface(s) at the boundary of the domain. As illustrated, the network interface device 140 is separated into two domains: a PCIe domain 210 and a network domain 220. The PCIe domain 210 has an interface to a PCIe interconnect, has operational and control state that is architecturally visible to a host operating system (e.g., host OS 132), and can be controlled by the host operating system. The network domain 220 has multiple physical ports 146A-B to a communications network and is not under control of the host operating system. The PCIe domain 210 and the network domain 220 can communicate with each other so that data can be passed from one domain to the other.

Generally, the network interface device 140 can be used to manage network traffic between a virtualization environment and a communications network. For example, the network traffic from the virtualization environment can be classified by a virtual machine that is a source or destination of the network traffic, and the network traffic of different virtual machines can be treated differently. The virtual machines can access the network interface device 140 from the PCIe domain 210. For example, the hypervisor can assign each virtual machine to a different virtual function 216 for accessing the network interface device 140. The virtual machine can send and receive network packets over the PCIe interconnect using its assigned virtual function. The network traffic associated with a given virtual function can be transferred between the PCIe domain 210 and a communications network using the logic within the network domain 220. As described below, the logic within the network domain 220 can be used to manage the network traffic of each of the different virtual machines based on various bandwidth, security, and availability criteria.

The PCIe domain 210 includes the host-network interface 160 which enables communications between the network interface device 140 and a PCIe interconnect. A host OS and/or hypervisor can communicate with the network interface device 140 by sending data and commands over the PCIe interconnect. The host network interface 160 can include multiple device functions, such as the physical function (PF) 214 and the virtual functions (VFs) 216. A given device function can be accessed by using an address that is assigned to the device function by the host OS or the hypervisor. As one example, the physical function 214 can be used by a hypervisor to detect capabilities of the network interface device 140 and to determine whether virtualization extensions are supported. The physical function 214 can present an abstract view of the network domain 220 to the host OS. For example, the network port advertised by the physical function 214 can appear to be unbundled, even when the physical ports 146A-B are configured as a LAG. As another example, the physical function 214 can have security modes (e.g., promiscuous mode, spoof checking, and a trust mode) differ from the security modes of the virtual functions or that represent the least restrictive set of security modes of the virtual functions. Each of the virtual functions 216 can be assigned to a virtual machine that is executing on a hypervisor.

The network domain 220 includes various modules for managing a network link and the network traffic flowing through the network link. For example, the modules can be used to manage the bandwidth, security, and availability of communication paths between the network and the different virtual machines executing in the virtualization environment. While FIG. 2 illustrates one organization of modules, other organizations are possible. The network domain 220 includes the physical ports 146A-B which enables communications between the network interface device 140 and a communications network. As one example, the physical ports 146A-B can communicate with the communications network using the Ethernet protocol. Ethernet implements a communications protocol at the physical and data link layers.

The physical ports 146A-B can be managed using the LAG management logic 145. For example, the LAG management logic 145 can communicate with a network device that is connected to the physical ports 146A-B over a pair of network links. The LAG management logic 145 can initiate and manage a control protocol, such as LACP, for bundling the links. The control protocol can be used to detect that different network links are connected to the same pair of devices, negotiate a speed and mode of the LAG, and monitor a status (e.g., up or down) of the links of the LAG (such as by monitoring whether a keep-live packet is received within a threshold period of time). The different LAG modes can be used to determine how the frames are sent across the network links. For example, a round-robin mode can be used to balance the frames across the links; a broadcast mode can be used to broadcast each frame across multiple links; an XOR mode can be used to select the network link based on a hash of the frame's source and destination addresses; an active-backup mode can be used to send frames across one link and reserve another link as a backup for when the primary link fails. As one example, the LAG management logic 145 can be programmed using a bonding interface manager (not shown). The bonding interface manager can communicate with the LAG management logic 145 over the physical ports 146A-B or another communication interface (not shown). For example, the bonding interface manager can include routing information, including LAG programming details for the physical ports 146A-B, for the communication network that is programmed by an administrator of the network.

The network domain 220 can include a PCIe domain interface 222 that is used for communicating between the network domain 220 and the PCIe domain 210. For example, the PCIe domain interface 222 can receive network packets (e.g., including the network layer (L3) and above) from the PCIe interconnect, encapsulate each network packet in an Ethernet frame, and queue the frame for transmission from one of the physical ports 146A-B into the network. The PCIe domain interface 222 can receive Ethernet frames from the physical ports 146A-B, unencapsulate each frame (e.g., remove the data link layer formatting) to generate a network packet, and buffer the network packet for a virtual machine. The PCIe domain interface 222 can notify the appropriate virtual function 216 when the network packet is received corresponding to the virtual function so that an interrupt signal can be asserted to alert the virtual machine that a network packet is available.

The network domain 220 can include VLAN allocation and control logic 240. The VLAN allocation and control logic 240 can be used to segregate network traffic from the different virtual machines and to forward the network traffic according to network policies for each of the virtual machines. A VLAN can partition network traffic flowing over a network link into different network flows, where each network flow can be identified using a VLAN identifier. For example, a group of VLAN identifiers (e.g., VLAN IDs 1-100) can be allocated to the LAG and initially unassigned to a virtual function. Each virtual function 216 can be assigned one or more VLAN identifiers from the group of VLAN identifiers, so that different virtual functions are assigned to different VLAN identifiers (e.g., a first virtual function can be assigned VLAN ID 1, a second virtual function can be assigned VLAN IDs 2-5, and so forth). Different rules can be applied to the network traffic associated with each VLAN identifier. A VLAN frame can be formatted according to a variety of protocols, such as IEEE 802.1Q. The VLAN allocation and control logic 240 can format egress frames according to the VLAN protocol and can remove VLAN formatting for ingress frames. The VLAN allocation and control logic 240 can enforce security modes for the different VLANs. For example, each VLAN can enforce different combinations of a promiscuous mode, spoof checking, and a trust mode so that a security level for each virtual machine can be different. For example, having a trust mode activated can enable a virtual machine to change its media access control (MAC) address. The VLAN control logic 240 can ensure that each virtual machine only sees the network traffic that is destined for that virtual machine. For example, the VLAN control logic 240 can route ingress network traffic to the appropriate virtual function based on the VLAN identifier.

The scheduling logic 230 can determine when to send network packets across the physical ports 146A-B and can determine when incoming network packets can be visible to the virtual functions. For example, the scheduling logic 230 can divide the available bandwidth across the physical ports 146A-B between the different VLANs and can manage the amount of bandwidth that is provided to each of the VLANs. As one example, network traffic with a first VLAN identifier can be prioritized over a network traffic with all other VLAN identifiers. Prioritizing traffic can be used to deliver a quality of service (QoS) for voice, video and other applications. As another example, the scheduling logic 230 can limit an amount of bandwidth provided for network traffic with a given VLAN identifier. As another example, the scheduling logic 230 can provide a bandwidth carveout to guarantee an amount of bandwidth to network traffic with a given VLAN identifier. As another example, the scheduling logic 230 can enable asynchronous bandwidth to network traffic with a given VLAN identifier, such that an ingress data rate is different from an egress data rate.

The virtual function health monitoring logic 250 can monitor the network traffic and/or behavior of the individual virtual functions (by monitoring the network traffic with VLAN identifiers corresponding to the virtual functions) to determine a health of the virtual machine associated with the virtual function. For example, the monitoring logic 250 can determine whether the network traffic is being sent and/or received by the virtual function. If the network traffic is stopped for a period of time, then the virtual machine associated with the virtual function may be down. The virtual function can also be used to pass status information to the health monitoring logic 250. For example, the virtual function can have an up or down status to indicate whether the network traffic is capable of being sent and/or received from the virtual machine associated with the virtual function. The virtual machine can be completely up or down and/or may be experiencing performance issues and between being up or down. For example, if network traffic is being consumed at half and expected rate, the virtual machine may be operational but unhealthy. If the virtual function health monitoring logic 250 determines that the virtual machine is down or unhealthy, actions can be initiated, such as failing over to a different virtual machine (on the same or a different host) and/or having the network traffic re-routed (such as by modifying a routing table of the network switch). For example, the virtual function health monitoring logic 250 can communicate with the network device that is connected to the physical ports 146A-B via network links. The communication can indicate that the connection to the virtual machine is down so that the network device can perform remedial actions, such as rerouting traffic to a different virtual machine on the same or a different host.

The optional wide area network (WAN) logic 260 can be used to communicate with other hosts connected to the communications network. For example, a centrally managed peering manager (not shown) can maintain a status of deployed hosts and can assist with fail-over in the event of a failure of a virtual machine and/or a server computer. Specifically, the WAN logic 260 can communicate with the peering manager over the LAG connected to the physical ports 146A-B. As one example, the control communication can be assigned a VLAN identifier (e.g., VLAN ID 99) that is reserved for control communications.

Additional features can be implemented in the network domain 220. For example, logic in the network domain 220 can perform authentication of a user based on a physical or virtual function. Specifically, device function port-based and user-based access control can be implemented. For example, credentials for the user can be received at the network domain 220 and authenticated using a network authentication protocol, such as 802.1x. The user can be requesting access to a virtual machine resource, where the virtual machine resource is associated with a physical and/or virtual function of the PCIe domain 210. The credentials for the user can be sent to a Remote Authentication Dial-In User Service (RADIUS) server to verify whether the credentials are authorized to access the virtual machine resource. Any number of users can be authorized to access the virtual machine resource. Specifically, more than 32 users can be authorized to access a virtual machine resource from a physical network port.

Figure 3:
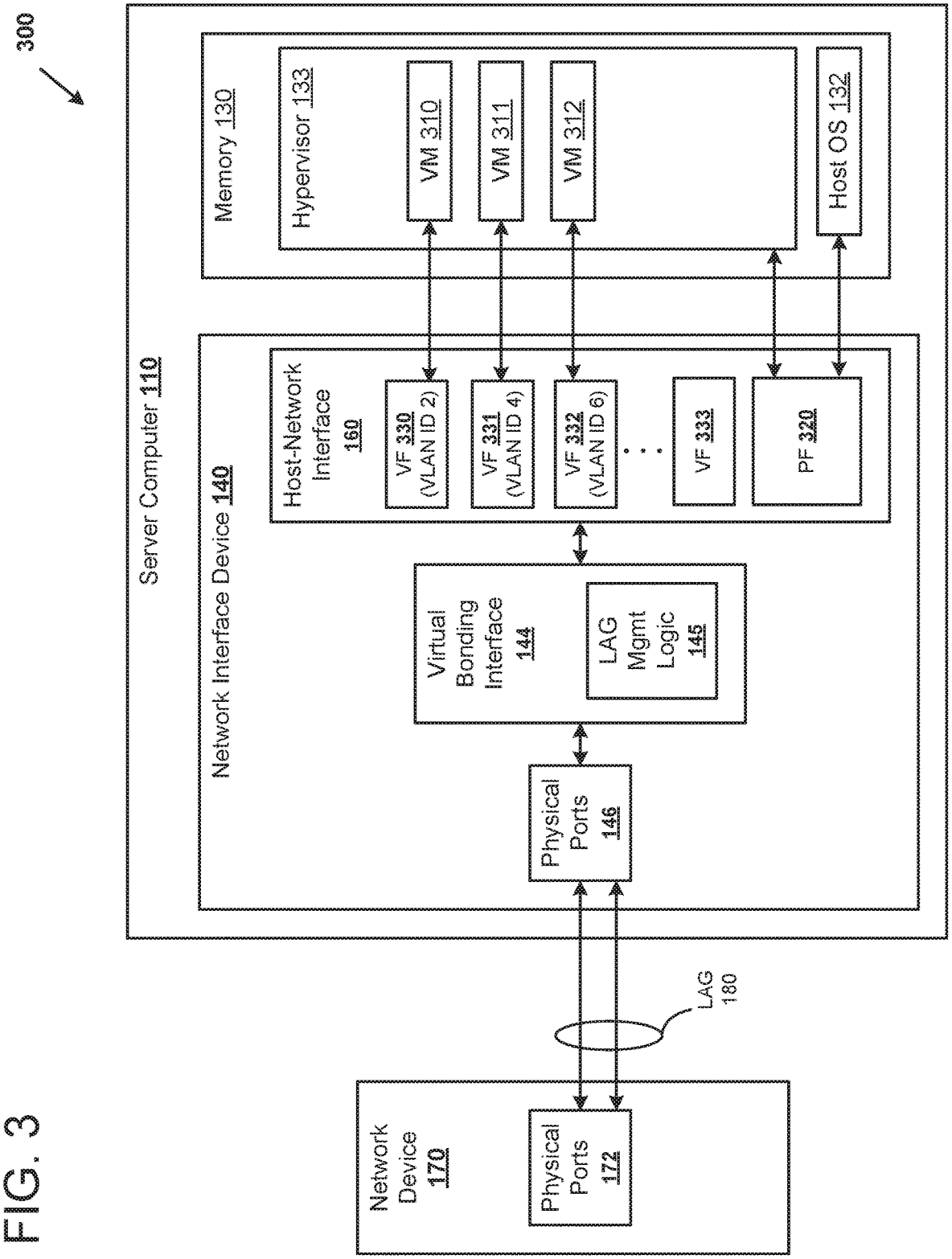
FIG. 3 illustrates an example of using the network interface device to manage network ports in a virtualization environment.

FIG. 3 illustrates an example 300 of using the network interface device 140 to manage network ports 146 in a virtualization environment (e.g., hypervisor 133). After a boot or reset of the server computer 110, the LAG management logic 145 can communicate with the network device 170 and can bundle the network links connecting the server computer 110 to the network device 170 without control from the host OS 132 or the hypervisor 133. The hypervisor 133 can launch and execute multiple virtual machines 310-312, where each virtual machine can execute a guest OS and/or software application(s). The hypervisor 133 can read the configuration space of the physical function 320 to determine that multiple virtual functions 330-333 are available for use by the virtualization environment. The hypervisor 133 can assign a distinct virtual function for each of the virtual machines. Specifically, the VM 310 can be assigned the virtual function 330; the VM 311 can be assigned the virtual function 331; and the VM 312 can be assigned the virtual function 332. The assigned virtual function can be used by the respective virtual machines for sending and receiving network traffic to and from the network interface device 140. Each of the virtual functions 330-333 can be assigned a VLAN for sending network traffic over the LAG 180. Specifically, the virtual function 330 can be assigned VLAN identifier 2; the virtual function 331 can be assigned VLAN identifier 4; and the virtual function 332 can be assigned VLAN identifier 6. Accordingly, there is a correspondence between a given virtual machine, virtual function, and VLAN.

As a specific example, the virtual machine 310 can send a network packet across the LAG 180 by using the interconnect of the server computer 110 to write the network packet data to the host network interface 160 at an address determined by the virtual function 330. The network interface device 140 can encapsulate the network packet and a VLAN frame using VLAN identifier (ID) 2. The frame can be scheduled according to the network policy of the network interface device 140. When the frame is scheduled to be sent, the frame can be sent across the LAG 180 and to the network device 170. As another example, a different frame can be received from the network device 170 at the physical ports 146. The frame can be analyzed to determine a VLAN identifier of the frame. For example, the VLAN identifier can be 6. The network policy can be identified for VLAN ID 6 to determine whether to notify the virtual machine associated with VLAN ID 6 that a network packet is available. For example, ingress traffic for VLAN ID 6 can be rate limited and so new packets may be parceled out at a rate slower than they are initially received over the LAG 180. The presence of the incoming network packet for VLAN ID 6 can be advertised by asserting an interrupt associated with the virtual function 332. The virtual machine 312 can detect that the interrupt is asserted and can read the network data from the host-network interface 160 by using an address associated with the virtual function 332. In this manner, the different virtual machines (where each virtual machine is assigned a different virtual function) can send and receive network traffic over a common LAG. The VLAN identifiers can be used to multiplex egress traffic across the common LAG and to demultiplex ingress traffic from the LAG so that it is sent to the appropriate virtual machine. The network traffic of the different virtual machines can be encapsulated by different VLANs and isolated from the network traffic of the other virtual machines. Additionally, each of the virtual machines can only send and receive network traffic using its assigned VLAN identifier(s) to increase a confidentiality and security of the network traffic of the virtual machine.

Figure 4:
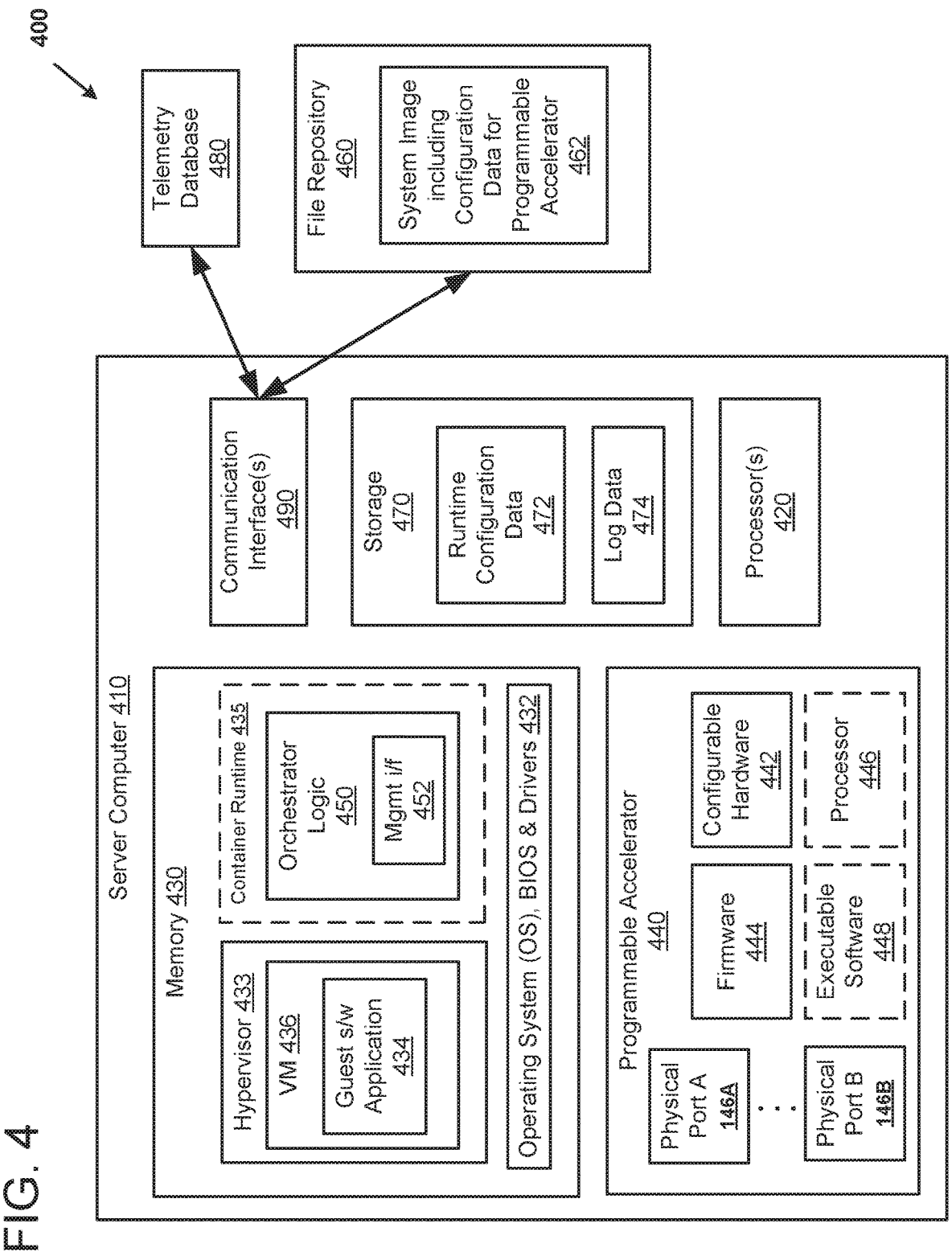
FIG. 4 is a block diagram of an example architecture including a programmable accelerator and orchestrator logic for configuring the programmable accelerator as a network interface device.

FIG. 4 is a block diagram of an example architecture 400 including a programmable accelerator 440 and orchestrator logic 450 for configuring the programmable accelerator 440 to perform the functions of a network interface device (such as the network interface device 140 of FIGS. 1-3). A programmable accelerator includes hardware that is dedicated to accelerating a computing task, where the accelerator hardware is separate from and in addition to a general-purpose processor (e.g., processor(s) 420) of the server computer 410. A programmable accelerator can include configurable hardware that is programmed to perform the task, a dedicated co-processor programed with software to perform the task, and/or an application-specific integrated circuit (ASIC) with programmable controls to perform the task, for example. As illustrated in FIG. 4, the programmable accelerator 440 includes configurable hardware 442, firmware 444, and optional processor 446 and executable software 448. The configuration of the programmable accelerators can be orchestrated to support large deployments of hardware and compute services by consistently, remotely, and dynamically enabling secure distribution and loading of programmable accelerator configuration files (e.g., bit files) and runtime configuration of programmable accelerator applications. Orchestrator architectures can package configuration data in a system image and distribute the system image via a file repository. A system image is a state of some or all components (e.g., one or more computer-readable memories) of a computer system that are encapsulated at a specific point in time (e.g., at a start or boot time, at a process-swap time, and so forth). Specifically, the system image can include programming data for configuring the programmable accelerator 440 as a network interface device as described herein.

The architecture 400 can include a server computer 410, a telemetry database 480, and a file repository 460. The server computer 410 can communicate with the telemetry database 480 and the file repository 460 using the communication interface(s) 490. For example, the communication interface(s) 490 can be connected to a public or private communications network providing communication paths among the server computer 410, the telemetry database 480, and the file repository 460. The server computer 410, the telemetry database 480, and the file repository 460 can each be implemented using a computing environment as described in more detail with reference to FIG. 8.

The server computer 410 can include the processor(s) 420, memory 430, a programmable accelerator 440, storage 470, and the communication interface(s) 490. The different components (420, 430, 440, 470, and 490) of the server computer 410 can be interconnected using a local interconnect (not shown) of the server computer 410 so that the different components can communicate with each other. The communication interface 490 can be used to send and receive communications (e.g., network packets) with other computing devices, such as a client and a server. The processor 420 can be used to execute computer-executable instructions that are stored in the memory 430 and/or storage 420. The computer-executable instructions can be organized into software routines (also referred to as modules or components) comprising executable code to perform various computing tasks. The memory 430 can also include structured and/or unstructured data that is used by the software routines to perform the computing tasks. It should be noted that while FIG. 4 illustrates one organization of routines, other organizations are possible. For example, the illustrated routines can be sub-divided into smaller routines and/or combined into larger routines.

The operating system (OS), basic input/output system (BIOS), and drivers 432 can include different software routines (e.g., kernel routines, BIOS settings, and device drivers) for managing different aspects of the execution of programs (e.g., guest software application 434 and orchestrator logic 450) and for interfacing with the hardware (e.g., the processor 420 and the programmable accelerator 440) of the server computer 410. For example, the OS 432 can manage the loading and removal of data, software applications, and other routines into the memory 430 of the server computer 410; the OS 432 can manage storage resources (e.g., storage 470) of the server computer 410; the OS 432 can manage processes and/or threads executing on the processor 420; the OS 432 can enable communications between software applications and the programmable accelerator 440; and the OS 432 can enable inter-process communication between different routines executing on the server computer 410. The OS and BIOS 432 can enable virtualization on the server computer 410, such as by implementing a virtualization extension (e.g., SR-IOV or MR-IOV). The OS 432 can include device drivers that are used for communicating between a program and hardware of the server computer 410. A device driver is a software that provides an interface between a program and computer hardware. Device drivers are generally specific to a particular operating system. As a specific example, a device driver can provide an interface between user-level programs and the programmable accelerator 440. Different programs may have different device drivers for accessing the programmable accelerator 440.

Programs can execute in a variety of ways on the server computer 410, such as directly on the OS 432, within the hypervisor 433, or within a container runtime 435. For example, a program can be launched from and be executed using the OS 432. When the program is launched from the OS 432, the services of the OS 432 can be directly accessed by the program. Additionally or alternatively, programs can be executed within an encapsulated software environment that runs on the OS 432, such as the hypervisor 433 or the container runtime 435.

The hypervisor 433 can implement a virtualization environment. For example, the hypervisor 433 can launch and execute the virtual machine 436 which can provide virtual storage, computation, networking, and memory resources for a guest software application 434 executing on the virtual machine 436. The hypervisor provides a layer of abstraction between the guest software application 434 and the OS 432 and the physical hardware. In other words, the guest software application 434 can execute on a guest operating system (not shown) of the virtual machine 436 which is emulated by the hypervisor 433, and the hypervisor 433 communicates with the OS 432 which communicates with the hardware of the server computer 410. The hypervisor 433 can provide isolation between different virtual machines executing on the hypervisor 433 by allocating private resources for the individual virtual machines.

A program can also run within a container runtime (e.g., container runtime 435). A container runtime is software that provides an encapsulated environment for a program to execute within. The encapsulated environment can be less complex than a full virtual machine and a guest operating system executing within a hypervisor. For example, OS routines can be shared between containers which can provide less isolation between the containers as compared to between virtual machines. One or more programs that run within a container can be referred to collectively as a service or a microservice. The container runtime can provide storage, computation, networking, and memory resources for the services executing on the container runtime. Multiple services can run within the container runtime. The container runtime can potentially enable programs to be more portable (e.g., because a container can have the same architecture even when executing on different physical hardware) compared to running directly on the OS 432. Programs executing within the container runtime may be less efficient than running directly on the OS 432 but more efficient than running in a virtual machine. On the other hand, programs executing within the container runtime may be more impacted by other programs executing within the container runtime as compared to programs running in different virtual machines. Example container runtimes are DOCKER and KUBERNETES.

The programmable accelerator 440 can be programmed to implement a network interface device as described above with reference to FIGS. 1-3. Specifically, a network interface device can be implemented using the configurable hardware 442 and the firmware 444. As another example, the network interface device can be implemented using dedicated hardware (e.g., a programmable processor, co-processor, ASIC, or graphics processor) that is different than and in addition to the processor 420. For example, the network interface device can be implemented using the executable software code 448 executing on the processor 446. As one example, the programmable accelerator 440 can be implemented as a printed circuit assembly (also referred to as an expansion card or a card) that is accessed over a local interconnect (e.g., a PCIe interconnect) of the server computer 410.

The configurable hardware 442 can include programmable logic such as a field-programmable gate array (FPGA), a programmable logic array (PLA), a programmable array logic (PAL), a generic array logic (GAL), or a complex programmable logic device (CPLD), for example. As one example, the configurable hardware 442 can include look-up tables (LUTs) that specify truth-tables for combinatorial logic, default values for storage elements (e.g., flip-flops), and connections between different routing channels that link the logic and storage elements. As another example, the configurable hardware 442 can include hard and/or soft processors and program memory for storing code that is executable by the hard and/or soft processors. As another example, the configurable hardware 442 can include customized hardware blocks (e.g., data-paths and pipelined processing elements) that can be selected and/or interconnected using programmable routing channels.

The configurable hardware 442 can be programmed at different levels and at different times. As one example, a hardware configuration of the configurable hardware 442 can initially be programmed, using the orchestrator logic 450, by loading hardware configuration data on control logic of the configurable hardware 442. The hardware configuration specifies the function of the hardware circuitry as the configurable hardware 442 exits a programming state or a reset state. In other words, the hardware configuration data programs the functionality of the electronic circuitry of the configurable hardware 442. The hardware configuration data can include the data that is loaded on the LUTs to control the functionality of the configurable hardware 442. The hardware configuration data can be loaded into a configuration memory of the configurable hardware 442 prior to being loaded on the control logic. The configurable hardware 442 can be programmed by writing directly to the configuration memory elements and/or by using a configuration engine (not shown) of the configurable hardware 442. For example, the configuration engine can control the sequencing of the operation and programming of the configurable hardware 442 so that portions of the configurable hardware 442 can be operational while other portions of the configurable hardware 442 are being configured or reconfigured (this may be referred to as partial reconfiguration).

As another example, a runtime configuration of the configurable hardware 442 can be programmed, using the orchestrator logic 450 and/or the guest software application 434, by programming firmware 444 of the configurable hardware 442. The firmware 444 is executable code (e.g., microcode), control data, and/or operational data that is applied to a hardware configuration of the configurable hardware 442 during a runtime (e.g., after reset is deasserted) of the configurable hardware 442. Accordingly, the firmware 444 is different from the hardware configuration data of the configurable hardware 442 based on when the programming occurs and where the programming is stored. The firmware 444 can be written to memory elements and control registers of the configurable hardware 442. Control registers can be modified (e.g., written to) to modify the functionality of the accelerator without changing the underlying electronic circuitry.

The file repository 460 can be used to store configuration data for the network interface device, where the configuration data can include the hardware configuration data and firmware. The file repository 460 can be a remote server computer that communicates with the server computer 410 via a communications network. The file repository 460 can include features for enabling version control, backups, access control, encryption, verification of data integrity, and other features suitable for storing data in a secure and reliable manner. As one example, the file repository 460 can include a file server application that communicates and interoperates with a file client application. For example, the container runtime 435 can include an integrated file client application that communicates with the file repository 460. The file repository 460 can store system images, such as the system image 462. The file repository 460 can generate a system image signature for each system image that can be used by a client of the file repository 460 to validate the sender and the data integrity of the system image.

The system image 462 can include the configuration data for the network interface device. For example, the system image 462 can include data for implementing a PCIe domain host-network interface and network domain logic including LAG management logic, scheduling logic, VLAN allocation and control logic, and virtual function health monitoring logic. The system image 462 can include additional data, such as executable code for the orchestrator logic 450, for example. The system image 462 can also include metadata, such as metadata for identifying different portions of the image and for verifying an integrity of the contents of the system image 462. The system image 462 can be stored in a computer-readable medium as one or more files or other data structures. As one example, a system image 462 can be organized as a file having variable sized sections, where each section of the file includes the state of a different memory component of the computer system at a launch time. Metadata of the system image can specify the size and/or relative position of each section and identify the component associated with each section. As a specific example, the system image 462 can include a hardware configuration data section including data to be loaded in a configuration memory of the configurable hardware 442. As another example, the system image 462 can include configuration data for the programmable accelerator and executable orchestrator code.

The orchestrator logic 450 can be used to orchestrate the configuration of the programmable accelerator 440. The orchestrator logic 450 can include additional modules such as diagnostics, health monitoring, and analytics for the programmable accelerator 440. The orchestrator logic 450 can implement a configuration sequence, such as described below with reference to FIG. 6, for sequencing the configuration of components of the server computer 410. The orchestrator logic 450 can be initiated from a user interface (e.g., a command line interface (CLI) or graphical user interface (GUI)) of the OS 432, from another application, or headlessly (e.g., from a script or boot-up sequence). The orchestrator logic 450 can execute directly as a process managed by the OS 432 or as a process managed by the container runtime 435. As one example, the container runtime 435 can be used to retrieve a system image (e.g., the system image 462) from the file repository 460, and the system image can be executed within a container of the container runtime 435. For example, the system image can include a code segment with a program (e.g., the orchestrator logic 450) for loading the configuration data onto the programmable accelerator 440. The system image can include a data segment where the configuration data of the programmable accelerator 440 is stored. By packaging the orchestrator logic 450 with the configuration data of the programmable accelerator 440 together in a single system image, compatibility of the loader and the configuration data can be ensured. As another example, the orchestrator logic 450 can execute directly on the OS 432 and can retrieve the system image 462 from the file repository 460. For example, the system image 462 can include the configuration data for the programmable accelerator 440, and orchestrator logic 450 can cause the configuration data to be loaded to the programmable accelerator 440.

The orchestrator logic 450 can enable other components of the server computer 410 to interoperate with the programmable accelerator 440. For example, the orchestrator logic 450 can configure the BIOS, such as by directly executing BIOS commands. Configuring the BIOS can include enabling virtualization. For example, the orchestrator logic 450 can install and/or enable various device drivers and/or kernel-level modules of the OS 432. For example, the orchestrator logic 450 can enable and/or install an SR-IOV or MR-IOV module to enable the programmable accelerator 440 to communicate over a PCIe interconnect. Executable code for the SR-IOV module can be included in the system image 462 or can be pre-installed with the OS 432. The management interface (Mgmt i/f) 452 can be used by an administrator or another user to monitor and/or modify operational data and/or configuration data of the programmable accelerator 440. For example, a client device (not shown) can communicate with the management interface 452 over the communication interface 490 by issuing a request conforming to an API of the management interface 452. For example, the management interface 452 can be used to supplement programming of the programmable accelerator 440, such as by modifying the firmware 444.

The orchestrator logic 450 can communicate with the telemetry database 480, using the communication interface 490, to provide configuration and operational data to the telemetry database 480. For example, the telemetry database 480 can include configuration data for server computers within a datacenter so that a utilization of the computers can be determined. The configuration data can map the software, firmware, and configurable hardware that is implemented on each of the server computers within the datacenter. Additionally, the orchestrator logic 450 can include modules for monitoring the server computer environment and the data being processed by the programmable accelerator 440. For example, the data collected and sent to the telemetry database 480 can include results of running diagnostic tests on the programmable accelerator 440, periodic environmental conditions (such as operating temperature, voltage, and current), soft error counts of memories, inbound packet counts, outbound packet counts, an attack status (such as a number of times that an attack has been detected), average network traffic latency, TCP response time, packet drop rates, the detection of various traffic patterns, the detection of a packet signature, and so forth. The telemetry database 480 and the configuration data stored therein can be served by a single server computer or among multiple distributed server computers.

The guest software application 434 can interoperate with the programmable accelerator 440 after the programmable accelerator 440 has been configured by the orchestrator logic 450. As one example, the guest software application 434 can communicate with the programmable accelerator 440 by communicating messages across an interconnect (not shown) of the server computer 410 using a driver (e.g., SR-IOV) of the OS 432.

Example Methods for Managing Network Ports in a Virtualization Environment

Figure 5:
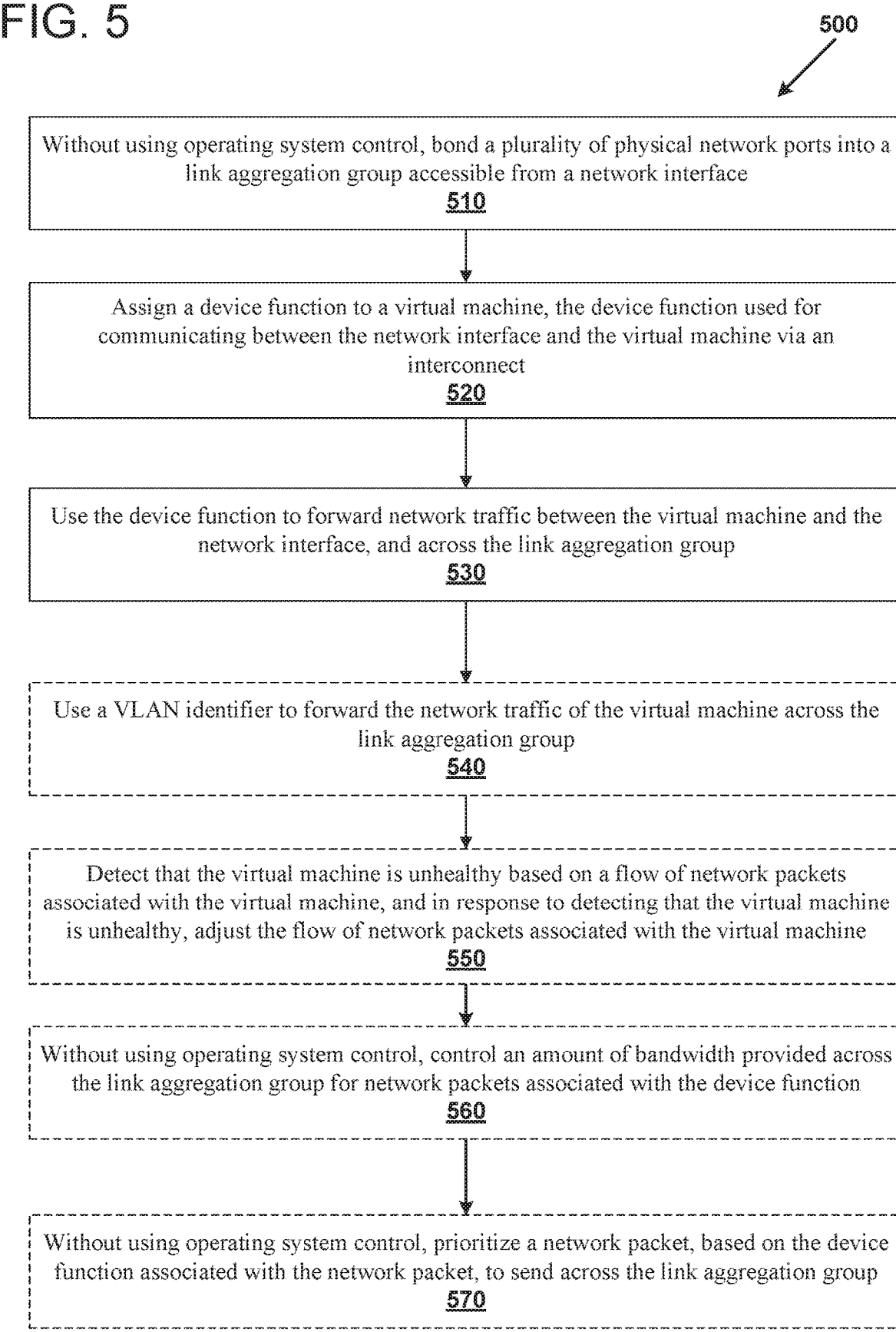
FIG. 5 is a flowchart of an example method for managing network ports in a virtualization environment.

FIG. 5 is a flowchart of an example method 500 for managing network ports in a virtualization environment. As one example, the method 500 can be used to manage the operation of and access to the network ports (e.g., the physical network ports 146 of a network interface device 140 of FIGS. 1-3) when an interconnect (such as PCIe) is used to transfer data between a host-network interface and a hypervisor executing one or more virtual machines. As a specific example, computer-executable instructions for carrying out the method 500 can be stored in computer-readable memory of a network interface device and the instructions can be executed by configurable hardware and/or one or more processor(s) to perform the method 500.

At 510, without using operating system control, a plurality of physical network ports can be bonded into a link aggregation group accessible from a network interface. For example, the server computer can be divided up into different logical domains based upon the functionality of logic within the domain and a source of control for the domain. A PCIe domain can include functionality that enables data to be transferred over a PCIe interconnect using commands from a host or guest operating system executing on the server computer. A network domain can include functionality that is used to control how data is transferred across a group of physical network ports. The network domain can be segregated from and outside of the control of the host and guest operating systems executing on the server computer. The network domain can include LAG management logic that is used two bond the group of physical network ports together as a LAG. The LAG management logic can communicate with LAG logic on a neighbor network device to perform the LAG. As one example, the LAG management logic can log into (e.g., using secure shell (SSH)) the network device and configure routing tables and other programmable state of the network device to configure the LAG. As another example, the LAG management logic can initiate and execute a control protocol for setting up the LAG. For example, the LACP protocol can be used to set up the LAG so that network traffic can be sent across the LAG. LACP can detect that different network links are connected to the same pair of devices, negotiate a speed and mode of the LAG, and monitor a status (e.g., up or down) of the links of the LAG. By executing the LAG management logic outside of the operating system control, incompatibilities within the operating system and between LAG functionality and virtualization functionality can potentially be avoided.

At 520, a device function can be assigned to a virtual machine. The device function can be used for communicating between the network interface and the virtual machine via an interconnect (such as PCIe). For example, the device function can be visible within a configuration space of a network interface device that includes the network interface. A host operating system can assign an address range to the network interface device, and the device function can be accessed using an address range within the address range of the network interface device. Multiple device functions can be available for a given network interface device. For example, the network interface device can include a physical function and multiple virtual functions. The host operating system and/or a hypervisor can assign a virtual function to the virtual machine, where the virtual machine executes within the hypervisor. Each virtual machine executing within the hypervisor can be assigned to use a different virtual function.

At 530, the device function can be used to forward network traffic between the virtual machine and the network interface, and across the link aggregation group. For example, the virtual machine can send network packets across the link aggregation group, via the network interface, by writing the network packet data to an address or range of addresses of the device function. Logic within the network domain can forward the network packet from the network interface and across the LAG. The virtual machine can receive network packets from the link aggregation group, via the network interface, by reading the network packet data from an address or range of addresses of the device function. For example, when a packet is received from across the LAG, logic in the network domain can buffer the network packet and the device function can alert the virtual machine that the network packet is available by asserting and interrupt signal. The network traffic of the different virtual machines can be transferred using the different device functions to potentially enhance a confidentiality and security of the network traffic of the virtual machines.

At optional 540, a VLAN identifier can be used to forward the network traffic of the virtual machine across the link aggregation group. For example, a VLAN identifier can be selected from a group of VLAN identifiers for use by network traffic associated with the device function. The group of VLAN identifiers can be the VLAN identifiers that have not been assigned to a device function yet. The selected VLAN identifier can be assigned to the device function so that each device function has different VLAN identifiers assigned to it. In other words, each device function can have one or more VLAN identifiers assigned to the device function for its exclusive use among the device functions. By assigning unique VLAN identifier(s) to each of the device functions, the VLAN traffic associated with an identifier can be isolated to a given device function. The VLAN identifier can be used to encapsulate a network packet in a frame that is sent over the LAG. The VLAN identifier can be used to identify a device function and virtual machine associated with an ingress frame. Additionally, the VLAN identifier can be used to demultiplex ingress network traffic from the link aggregation group. Specifically, the VLAN identifier can be matched to a device function and the network traffic can be sent only to the matching device function.

At optional 550, the virtual machine can be determined to be unhealthy based on a flow of network packets associated with the virtual machine. The health of the virtual machine can be determined by measuring an operational characteristic of the network flow or of the virtual machine and comparing the measured operational characteristic against a health criterion or criteria. If the measured operational characteristic fails to meet any health criteria, the virtual machine may be unhealthy. As one example, a health criterion can be a specified rate of consumption of network packets by the virtual machine. If the virtual machine consumes network packets at a rate less than the specified rate of consumption, the virtual machine can be determined to be unhealthy. As another example, a health criterion can be a minimum specified rate of transmission of network packets by the virtual machine. If the virtual machine transmits network packets at a rate less than the minimum specified rate of transmission, the virtual machine can be determined to be unhealthy. The flow of network packets associated with the virtual machine can be adjusted in response to detecting that the virtual machine is unhealthy. For example, a new virtual machine can be launched, on the same or another host, and the network packets can be rerouted to the newly launched virtual machine. As another example, the flow of network packets associated with the virtual machine can be rerouted to a different existing virtual machine on the same or a different host. As another example, a health criterion can be a maximum specified rate of transmission of network packets by the virtual machine. If the virtual machine transmits network packets at a rate greater than the maximum specified rate of transmission, the virtual machine can be determined to be unhealthy. For example, the virtual machine may be a witting or unwitting attacker or a programming error may have caused the virtual machine to transmit too many packets. The flow of network packets associated with the unhealthy virtual machine can be clamped in response to detecting that the virtual machine is unhealthy.

At optional 560, without using operating system control, an amount of bandwidth provided across the link aggregation group can be controlled for network packets associated with the device function. For example, the scheduler logic within the network domain can be used to control the amount of bandwidth given to any particular device function. For example, the scheduler logic can provide a balanced allocation to each of the device functions, a bandwidth carveout providing a minimum amount of bandwidth to one or more of the device functions, and/or a rate-limited or throttled amount of bandwidth providing a maximum amount of bandwidth to one or more of the device functions. The amount of bandwidth provided to a device function can differ for egress and ingress network packets, so that the device function can have an asynchronous bandwidth.

At optional 570, without using operating system control, a network packet can be prioritized, based on the device function associated with the network packet, to send across the link aggregation group. For example, virtual machines executing real-time applications, such as video-on-demand or voice-over-IP, can be provided with a higher quality of service than non-time-critical applications by prioritizing the network packets for device functions associated with real-time applications.

Figure 6:
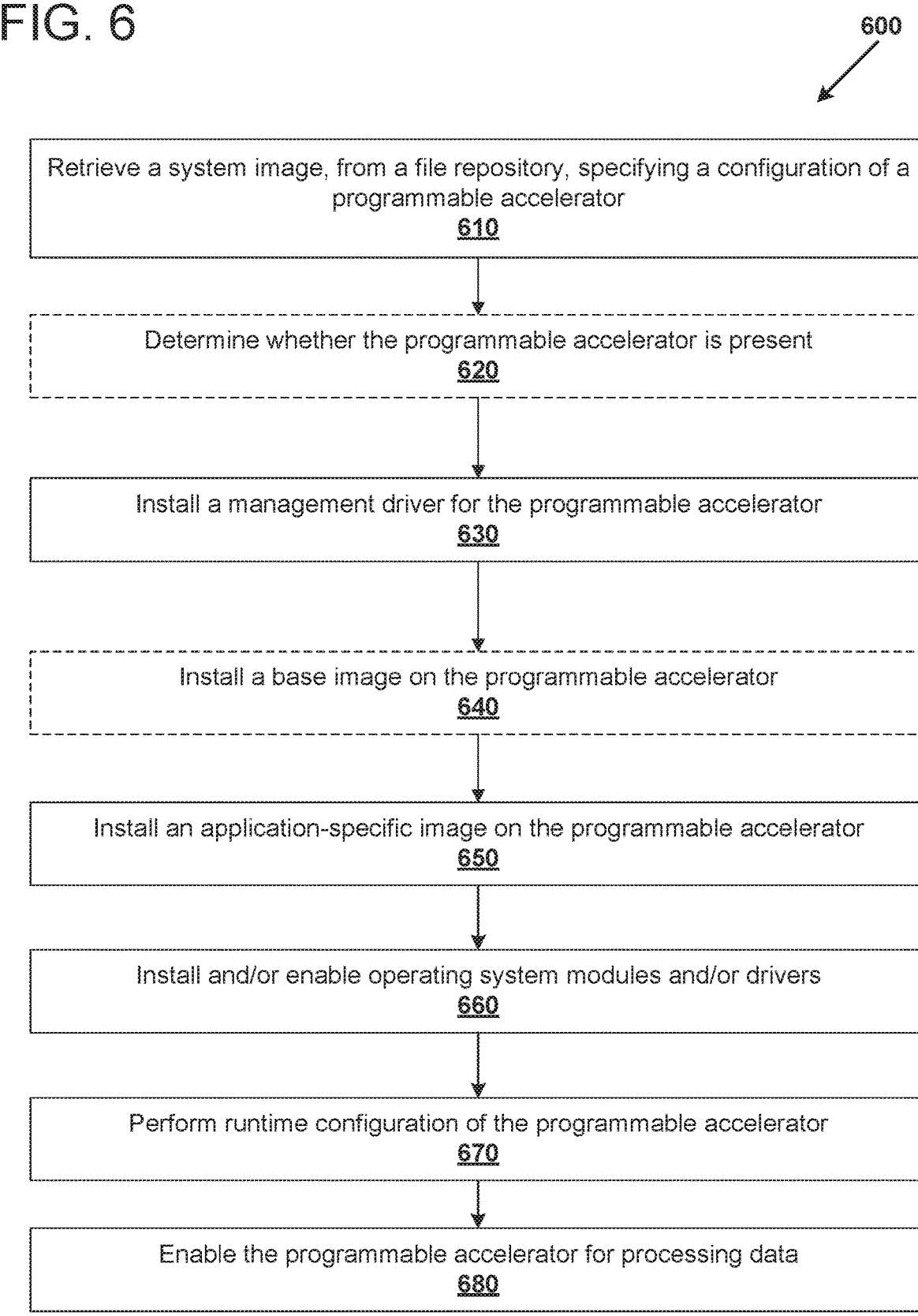
FIG. 6 is a flowchart of an example method for orchestrating the configuration of a programmable accelerator to perform the operations of a network interface device that can be used for managing network ports in a virtualization environment.

FIG. 6 is a flowchart of an example method 600 for orchestrating the configuration of a programmable accelerator (such as the programmable accelerator 440 of FIG. 4) to perform the operations of a network interface device (such as the programmable accelerator 140 of FIGS. 1-3) that can be used for managing network ports in a virtualization environment. Specifically, the method 600 can coordinate and sequence the configuration of the programmable accelerator within a computer system, such as the computer system of FIG. 4. As a specific example, computer-executable instructions for carrying out the method 600 can be stored in computer-readable memory (e.g., the memory 430) and the instructions can be executed by one or more processor(s) (e.g., the processor 420) to perform the method 600.

At 610, a system image can be retrieved from a file repository. The system image can include configuration data for configuring a programmable accelerator to perform the operations of a network interface device. The configuration data can include a hardware configuration (e.g., a bit file) for configuring configurable hardware and/or firmware for programming the configurable hardware after the hardware configuration has been programmed onto the configurable hardware. As one example, the configurable hardware can include multiple configurable regions that can be configured at the same or different times. The hardware configuration can include multiple hardware configurations corresponding to the different re-configurable regions. As a specific example, a first hardware configuration can include a base configuration for enabling the programmable hardware to communicate with an interconnect using a particular software driver and for providing basic functionality for the programmable hardware. A second hardware configuration can include functionality that is associated with a software program (e.g., a guest software program executing within a hypervisor) that will execute on the computer system. The system image can include executable code for orchestrator logic which will be programmed into the programmable logic with the hardware configuration and/or the firmware. The file repository can include a file repository server program which communicates with a file repository client program. The file repository client program can be used to retrieve or pull the system image from the file repository. The file repository client program can use a digital signature sent with or as part of the system image to validate the data integrity of the system image. For example, the file repository server can create the digital signature using a private key of the file repository server when the system image is loaded to the file repository server. The file repository client program can use a public key of the file repository server to validate the digital signature sent with the system image when it is retrieved by the file repository client program.

At optional 620, it can be determined whether the programmable accelerator is present. As one example, the server computer 410 can include a file or other data structure (e.g., a registry) stored in the memory 430 or storage 470 that identifies drivers, hardware, and/or other configuration settings of the server computer 410. The file or other data structure can be searched to determine whether the programmable accelerator is present. As another example, components of the server computer 410 can be interrogated to determine whether any of the components are or include the programmable accelerator. For example, each of the components connected to an interconnect of the server computer 410 can include a register that identifies a type of the component. The types of the components can be compared to the programmable accelerator type to determine whether the programmable accelerator is present. As one example, the operations at 620 can occur during a device discovery sequence where device identification registers and vendor registers are read.

At 630, a management driver can be installed for the programmable accelerator. As one example, the management driver can include the orchestrator logic 450. As another example, the management driver can include a hardware driver for the programmable accelerator that enables the orchestrator logic 450 to interface to the configuration hardware of the programmable accelerator.

At optional 640, a base image can be installed on the programmable accelerator. The base image can include a hardware configuration for one or more re-configurable regions of the configurable hardware. The base image can include firmware to apply to the hardware configurations of the base image. For example, the base image can include input and output logic for the configurable hardware so that different applications may access the programmable accelerator. The base image can include sandbox areas which only allow specified transactions at the interface of the sandbox and the other re-configurable regions. The sandbox areas can be re-configurable regions that are reserved for a particular software application and that have limited capabilities when accessing internal components of the server computer 410. By limiting the interactions that can occur with the other components of the server computer 410, a security of the server computer 410 and the data center in which it resides can potentially be increased. Installing the base image can include loading a configuration memory of the configurable hardware. As one example, the configuration memory can be loaded by writing directly to the configuration memory. As another example, the configuration memory can be loaded by interfacing with a configuration port that may load the configuration memory using a scan chain or other serialized connection. The contents of the configuration memory can be copied from the configuration memory to the control logic of the configurable hardware to complete the programming of the configurable hardware.

At 650, an application-specific image can be installed on the programmable accelerator. Specifically, the image can be customized to work with a particular software application (e.g., the guest software application 434). The application-specific image can include a hardware configuration for one or more re-configurable regions of the configurable hardware and firmware to be applied to the configurable hardware. Specifically, the application-specific image can include a hardware accelerator that is customized to work with the software application. As described above, the application-specific hardware configuration can be loaded to the configuration memory of the configurable hardware by writing directly to the configuration memory and/or by using a configuration port the load the configuration memory. The application-specific image can be loaded before or after the base image (if used) is operational. As one example, the configurable hardware can be held in a reset or a programming mode while both the base image and the application-specific image are loaded onto the configurable hardware. As another example, the base image can be loaded, reset can be deasserted, and then the application-specific image can be loaded while the base image is operational.

At 660, operating system modules and/or drivers can be installed and/or enabled. The modules and/or drivers can enable the software application to communicate with the programmable logic. As one example, an SR-IOV module can be installed. As one example, the drivers and/or modules can be encapsulated in the system image that is retrieved from the file repository. As another example, metadata within the retrieved system image can specify a version of the drivers and/or the modules that are to be used, and the executable code for the drivers and/or the modules can be external to the system image.

At 670, runtime configuration of the programmable accelerator can be performed. The runtime configuration can include settings and/or code that is applied while the programmable hardware is active (e.g., when reset is deasserted). As one example, the hardware can be active for programming prior to the hardware being active for processing data. As another example, data processing and runtime configuration can be performed concurrently. Performing runtime configuration can include writing to control registers of the programmable hardware, loading credentials on the programmable hardware, loading microcode onto the configurable data path, loading a program memory for execution by a hard or soft processor of the programmable hardware, and any other configuration that occurs during a runtime of the programmable accelerator. The runtime configuration can occur by issuing commands from the management interface 452 and/or the guest software application 434. The commands can be communicated, via an OS driver, to the programmable accelerator, where the commands can be performed. The commands used to generate the runtime configuration and/or the state of the programmable accelerator as the runtime configuration is applied can be recorded and stored (such as in the runtime configuration data 472).

At 480, the programmable accelerator can be enabled for sending network traffic across a LAG. As one example, the status of the programmable accelerator can be communicated using a control register of the programmable accelerator. Specifically, the management interface 452 or the software application 434 can read the status register to determine whether the programmable accelerator is enabled for processing data. As another example, the management interface 452 or a software application 434 can write the status register to enable the programmable accelerator for processing data. Processing the data can include receiving network traffic at a network interface and performing a management function to the network traffic before dropping or forwarding the network traffic from the network interface. For example, processing the data can include performing encryption, decryption, or other cryptographic operations. As another example, processing the data can include routing the network traffic to/from a virtual machine executing on the hypervisor 433.

Example Computing Environments

Figure 7:
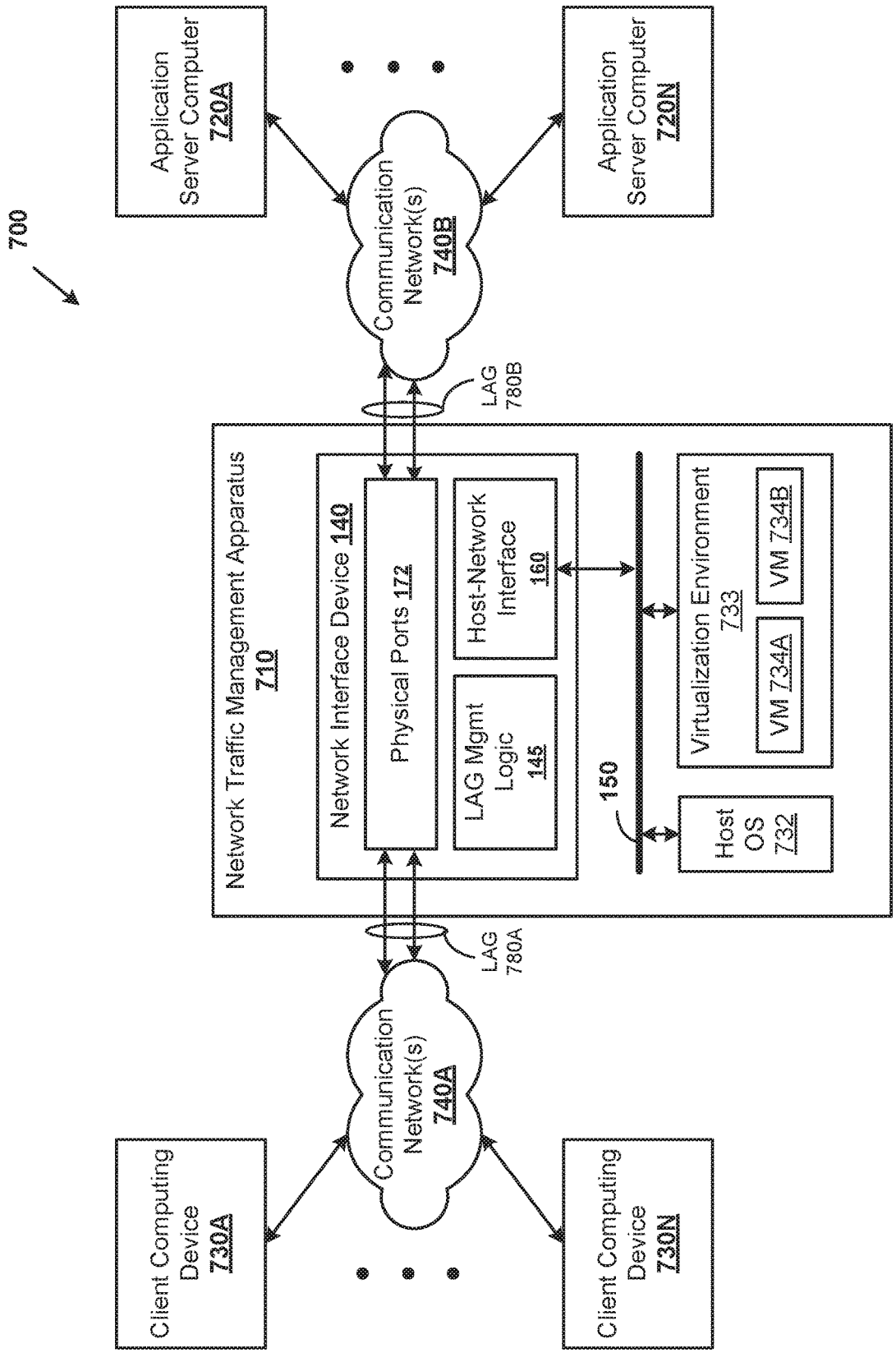
FIG. 7 is a block diagram of an example client-server architecture including a network traffic management apparatus implementing a method for managing network ports in a virtualization environment.

FIG. 7 illustrates an example client-server architecture 700 (also referred to as a network traffic management system) that incorporates a network traffic management apparatus 710. The client-server architecture 700 includes a network traffic management apparatus 710 that is coupled to one or more server computers (such as server computers 720A-N) and one or more client devices (such as client computing devices 730A-N) via one or more communication networks (such as the communication networks 740A and 740B). The server computers 720A-N can communicate with one or more additional server computer(s) that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 710 is positioned in-line between the client computing devices 730A-N and the server computers 720A-N so that the network traffic management apparatus 710 can intercept all network traffic flowing between the different networks 740A and 740B. In other examples, the network traffic management apparatus 710, the server computer 720A-N, and the client devices 730A-N can be coupled together via other topologies. As one specific example, the server computers 720A-N can be integrated within the network traffic management system 700 (e.g., server computer functions can be implemented in software within one or more devices of the network traffic management apparatus 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
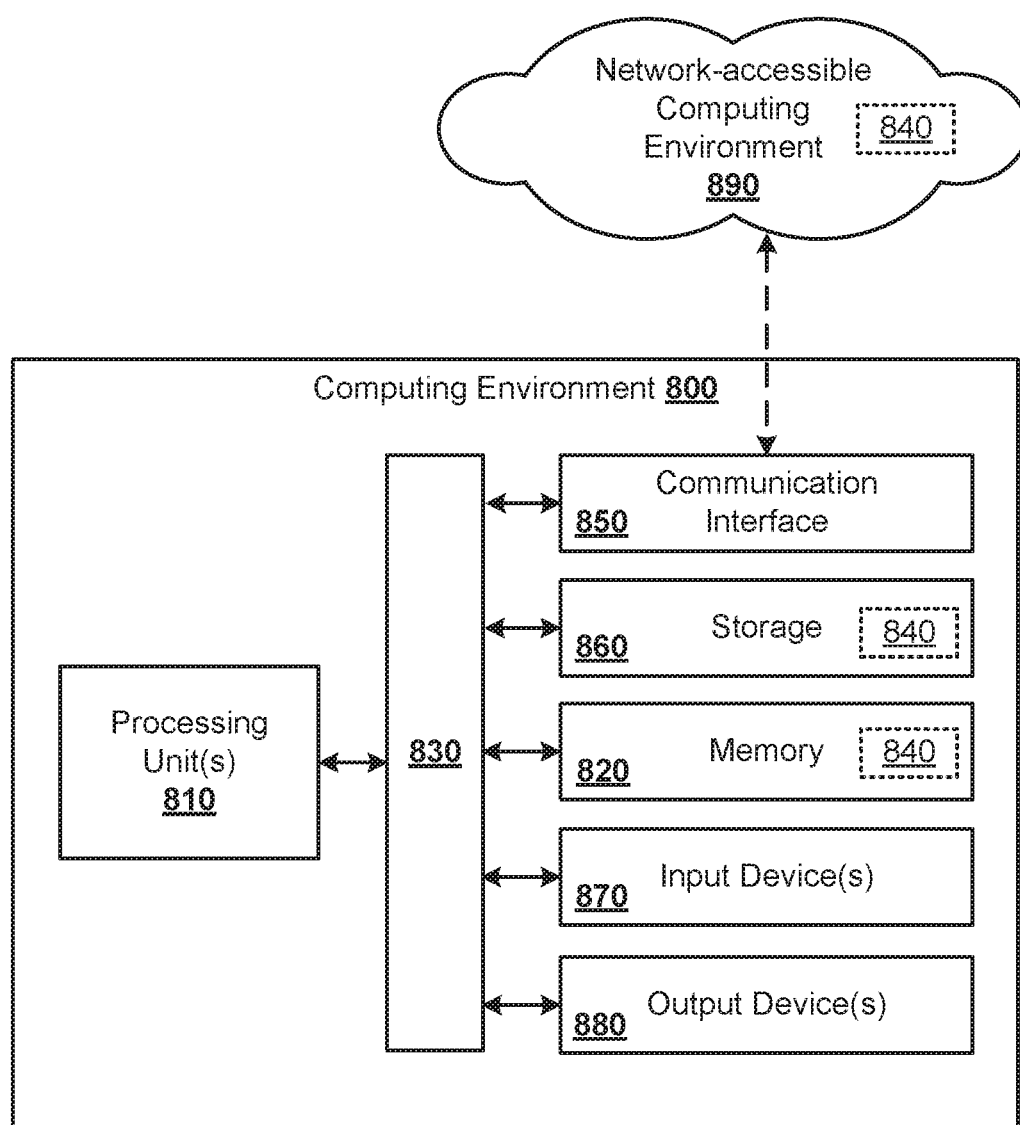
FIG. 8 is a block diagram of an example computing environment, such as can be used for a server computer.

Generally, the server computers 720A-N, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic management apparatus 710 or the server computers 720A-N.

The server computers 720A-N can include any type of computing device that can exchange network data. For example, the server computers 720A-N can exchange network data with the client devices 730A-N and with each other. As another example, the server computers 720A-N can exchange communications along communication paths specified by application logic in order to facilitate a client-server application interacting with the client devices 730A-N. Examples of the server computers 720A-N can include application servers, database servers, access control servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic management apparatus 710) in response to requests from the client devices 730A-N. The server computers 720A-N can be hardware and/or software and may represent a system with multiple servers in a pool, which may include internal or external networks.

While the server computers 720A-N are illustrated as single devices, one or more actions of each of the server computers 720A-N may be distributed across one or more distinct network computing devices that together comprise one or more of the server computers 720A-N. Moreover, the server computers 720A-N are not limited to a particular configuration. Thus, the server computers 720A-N may contain network computing devices that operate using a coordinated approach, whereby one of the network computing devices of the server computers 720A-N operate to manage or otherwise coordinate operations of the other network computing devices. Each of the server computers 720A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N can operate within the network traffic management apparatus 710 itself rather than as a stand-alone server device communicating with the network traffic management apparatus 710 via communication network 740B. In this example, the one or more of the server computers 720A-N operate within the memory of the network traffic management apparatus 710.

The network traffic management apparatus 710 can include any type of computing device that can be used for managing network traffic. The network traffic management apparatus 710 can perform a number of functions, including providing network security, access control, load balancing network traffic across the server computers 720A-N, and/or accelerating network traffic associated with an application hosted by one or more of the server computers 720A-N, for example. Network service(s) 750 can be used to perform some or all of the functions of the network traffic management apparatus 710. For example, the service(s) can perform proxy and other services on behalf of the server 720A-N and manage traffic between the clients 730A-N and the servers 720A-N. Additionally, the network traffic management apparatus 710 can include other network devices such as one or more routers or switches, for example.

The network traffic management apparatus 710 can include the network interface device 140, a host OS 732, a virtualization environment 733, and an interconnect 150 for communicating between the different components. Network traffic flowing into and out of the network traffic management system 700 can be managed using the network interface device 140. The network interface device 140 can include the LAG management logic 145, the host-network interface 160, and the physical network ports 172. The physical network ports 172 can be connected by network links to physical network ports of network devices (not shown) within the communication networks 740A-B. The network links can be configured using the LAG management logic 145 to form the LAGs 780A-B. The LAG management logic 145 can execute outside of the control of the host OS 732 and guest OSs executing within the virtualization environment 733. As one example, the virtualization environment 733 can include a hypervisor that is capable of launching and executing on one or more virtual machines 734A-B. Guest software applications (not shown) executing on one or more virtual machines 734A-B of the virtualization environment 733 can be used to process the network traffic of the network traffic management apparatus 710. For example, the guest software applications can include web proxy software, firewall software, web server software, and other applications for processing network traffic. The applications executing within the virtualization environment 733 can send and receive network traffic as described above with reference to FIGS. 1-3 and 5. The network interface device 140 can manage the network traffic and can be configured as described above with reference to FIGS. 1-6.

While the network traffic management apparatus 710 is illustrated in this example as including a single device, the network traffic management apparatus 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 710. Additionally, the network traffic management apparatus 710 and/or the application(s) executed by the network traffic management apparatus 710 can be operative in a cloud-based computing environment. The application(s) can be executed within or as virtual machine(s) or virtual server(s) that can be managed in a cloud-based computing environment. For example, the application(s), and even the network traffic management apparatus 710 itself, can be located in virtual server(s) running in a cloud-based computing environment rather than being tied to one or more specific physical network computing devices. Also, the application (s) can be running in one or more virtual machines (VMs) executing on the network traffic management apparatus 710. Additionally, in one or more examples of this technology, virtual machine(s) running on the network traffic management apparatus 710 can be managed or supervised by a hypervisor. Additionally, one or more of the components that together comprise the network traffic management apparatus 710 can be standalone devices or integrated with one or more other devices or apparatuses, such as with one or more of the server computers 720A-N, for example.

Additionally, one or more of the components depicted in the client-server architecture 700, such as the network traffic management apparatus 710, server computers 720A-N, or client computing devices 730A-N, for example, may be configured to operate as virtual instances on the same physical machine. In other words, one or more of the network traffic management apparatus 710, server computers 720A-N, or client computing devices 730A-N may operate on the same physical device rather than as separate devices communicating through communication networks 740A and 740B. Additionally, there may be more or fewer network traffic management apparatuses, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a network traffic management apparatus including an intermediary server that performs the disclosed techniques for managing network ports in a virtualization environment.

The computing environment 800 includes at least one processing unit 810 and computer-readable memory 820, which are coupled together by an interconnect 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 7, a communication interface of the network traffic management apparatus 710 operatively couples to and communicates with the communication networks 740A and 740B so that the network traffic management apparatus 710 is coupled to and can communicate with the server computers 720A-N and the client computing devices 730A-N.

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples.

The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for managing network ports in a virtualization environment) can be located in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more network traffic management apparatuses, server devices, or client devices, the method comprising:

bonding a plurality of physical network ports into a link aggregation group accessible from a network interface using a virtual bonding interface of a network interface device that segregates port bundling functionality from an operating system of a host computer such that the host operating system of the host computer is not aware of the link aggregation group;

assigning a device function of the network interface device to a virtual machine, the device function used for communicating between the network interface and the virtual machine via an interconnect of the host computer, the virtual machine executing on the host computer;

using the device function to forward network traffic between the virtual machine and the network interface, and across the link aggregation group; and without using operating system control, controlling an existing amount of bandwidth provided across the link aggregation group for network packets associated with the device function.

2. The method of claim 1, further comprising:
assigning a virtual local area network (VLAN) identifier to the device function, the assigned VLAN identifier selected from a plurality of unassigned VLAN identifiers; and
using the VLAN identifier to forward the network traffic of the virtual machine across the link aggregation group.

3. The method of claim 1, further comprising:
detecting that the virtual machine is unhealthy based on a flow of network packets associated with the virtual machine; and
in response to detecting that the virtual machine is unhealthy, adjusting the flow of network packets associated with the virtual machine.

4. The method of claim 1, further comprising:
without using operating system control, prioritizing a network packet, based on the device function associated with the network packet, to send across the link aggregation group.

5. A system comprising one or more network traffic management modules, networking modules, or server modules, memory comprising programmed instructions stored thereon, and one or more processors configured to be capable of executing the stored programmed instructions to:
bond a plurality of physical network ports into a link aggregation group accessible from a network interface using a virtual bonding interface of a network interface device that segregates port bundling functionality from an operating system of a host computer such that the operating system of the host computer is not aware of the link aggregation group;
assign a device function of the network interface device to a virtual machine, the device function used for communicating between the network interface and the virtual machine via an interconnect of the host computer, the virtual machine executing on the host computer;
use the device function to forward network traffic between the virtual machine and the network interface, and across the link aggregation group; and
without using operating system control, control an existing amount of bandwidth provided across the link aggregation group for network packets associated with the device function.

6. The system of claim 5, wherein the one or more processors are further configured to be capable of executing the stored programmed instructions to:
assign a virtual local area network (VLAN) identifier to the device function, the assigned VLAN identifier selected from a plurality of unassigned VLAN identifiers; and
use the VLAN identifier to forward the network traffic of the virtual machine across the link aggregation group.

7. The system of claim 5, wherein the one or more processors are further configured to be capable of executing the stored programmed instructions to:
detect that the virtual machine is unhealthy based on a flow of network packets associated with the virtual machine; and
in response to detecting that the virtual machine is unhealthy, adjust the flow of network packets associated with the virtual machine.

8. The system of claim 5, wherein the one or more processors are further configured to be capable of executing the stored programmed instructions to:
without using operating system control, prioritize a network packet, based on the device function associated with the network packet, to send across the link aggregation group.

9. A non-transitory computer readable medium having stored thereon instructions comprising executable code that, when executed by one or more processors, causes the processors to:
bond a plurality of physical network ports into a link aggregation group accessible from a network interface using a virtual bonding interface of a network interface device that segregates port bundling functionality from an operating system of a host computer such that the operating system of the host computer is not aware of the link aggregation group;
assign a device function of the network interface device to a virtual machine, the device function used for communicating between the network interface and the virtual machine via an interconnect of the host computer;
use the device function to forward network traffic between the virtual machine and the network interface, and across the link aggregation group; and
without using operating system control, control an existing amount of bandwidth provided across the link aggregation group for network packets associated with the device function.

10. The non-transitory computer readable medium of claim 9, wherein the instructions further comprise executable code that, when executed by one or more processors, causes the processors to:
assign a virtual local area network (VLAN) identifier to the device function, the assigned VLAN identifier selected from a plurality of unassigned VLAN identifiers; and
use the VLAN identifier to forward the network traffic of the virtual machine across the link aggregation group.

11. The non-transitory computer readable medium of claim 9, wherein the instructions further comprise executable code that, when executed by one or more processors, causes the processors to:
detect that the virtual machine is unhealthy based on a flow of network packets associated with the virtual machine; and
in response to detecting that the virtual machine is unhealthy, adjust the flow of network packets associated with the virtual machine.

12. The non-transitory computer readable medium of claim 9, wherein the instructions further comprise executable code that, when executed by one or more processors, causes the processors to:
without using operating system control, prioritize a network packet, based on the device function associated with the network packet, to send across the link aggregation group.

13. A network traffic management apparatus, comprising memory comprising programmed instructions stored thereon and one or more processors configured to be capable of executing the stored programmed instructions to:
bond a plurality of physical network ports into a link aggregation group accessible from a network interface using a virtual bonding interface of a network interface device that segregates port bundling functionality from an operating system of a host computer such that the operating system of the host computer is not aware of the link aggregation group;

assign a device function of the network interface device to a virtual machine, the device function used for communicating between the network interface and the virtual machine via an interconnect of the host computer, the virtual machine executing on the host computer;

use the device function to forward network traffic between the virtual machine and the network interface, and across the link aggregation group; and without using operating system control, control an existing amount of bandwidth provided across the link aggregation group for network packets associated with the device function.

14. The network traffic management apparatus of claim 13, wherein the one or more processors are further configured to be capable of executing the stored programmed instructions to:

assign a virtual local area network (VLAN) identifier to the device function, the assigned VLAN identifier selected from a plurality of unassigned VLAN identifiers; and use the VLAN identifier to forward the network traffic of the virtual machine across the link aggregation group.

15. The network traffic management apparatus of claim 13, wherein the one or more processors are further configured to be capable of executing the stored programmed instructions to:

detect that the virtual machine is unhealthy based on a flow of network packets associated with the virtual machine; and in response to detecting that the virtual machine is unhealthy, adjust the flow of network packets associated with the virtual machine.

16. The network traffic management apparatus of claim 13, wherein the one or more processors are further configured to be capable of executing the stored programmed instructions to:

without using operating system control, prioritize a network packet, based on the device function associated with the network packet, to send across the link aggregation group.

* * * * *